United States Patent
Lemelson

(10) Patent No.: US 7,065,856 B1
(45) Date of Patent: Jun. 27, 2006

(54) MACHINE TOOL METHOD

(76) Inventor: Jerome H. Lemelson, 85 Rector St., Metuchen, NJ (US) 08840

( * ) Notice: Subject to any disclaimer, the term of this patent is extended or adjusted under 35 U.S.C. 154(b) by 0 days.

(21) Appl. No.: 07/126,319

(22) Filed: Nov. 10, 1987

Related U.S. Application Data

(60) Continuation of application No. 06/251,656, filed on Apr. 6, 1981, now abandoned, which is a continuation of application No. 06/091,908, filed on Nov. 6, 1979, now abandoned, which is a continuation of application No. 05/107,357, filed on Jan. 18, 1971, now abandoned, which is a continuation-in-part of application No. 04/858,560, filed on Aug. 29, 1969, now Pat. No. 3,854,889, which is a continuation of application No. 04/629,758, filed on Apr. 10, 1967, now abandoned, which is a continuation-in-part of application No. 04/465,812, filed on Apr. 8, 1965, now Pat. No. 3,313,014, which is a continuation-in-part of application No. 04/152,702, filed on Oct. 17, 1961, now abandoned, which is a division of application No. 03/449,874, filed on Jul. 28, 1954, now abandoned, said application No. 04/107,357 is a continuation-in-part of application No. 04/717,065, filed on Mar. 12, 1968, now Pat. No. 3,559,257, and a continuation-in-part of application No. 04/712,443, filed on Mar. 12, 1968, now Pat. No. 3,559,256, said application No. 05/717,065 is a continuation-in-part of application No. 04/387,954, filed on Aug. 6, 1964, now Pat. No. 3,372,568, which is a continuation-in-part of application No. 04/219,357, filed on Aug. 13, 1962, now abandoned, which is a continuation-in-part of application No. 03/557,415, filed on Apr. 10, 1956, now Pat. No. 3,049,247, which is a continuation-in-part of application No. 03/477,467, filed on Dec. 24, 1954, now abandoned, and a continuation-in-part of application No. 03/449,874, filed on Jul. 28, 1954, now abandoned.

(51) Int. Cl.
*B23Q 7/00* (2006.01)

(52) U.S. Cl. .......................... 29/563; 29/568; 29/563; 29/564; 408/3; 408/234; 408/32; 408/34; 408/37; 408/42; 408/43; 483/1; 483/14; 483/15; 483/32; 451/5; 700/159; 700/160; 700/169; 72/399; 72/400

(58) Field of Classification Search .................. 29/563, 29/568, 564; 408/3, 32, 34, 234, 37, 42, 408/43; 483/1, 14, 15, 32; 451/5; 400/159, 400/160; 700/169; 72/399, 400
See application file for complete search history.

(56) References Cited

U.S. PATENT DOCUMENTS

| | | | |
|---|---|---|---|
| 159,180 A | 1/1875 | Holt | 29/30 |
| 399,406 A | 3/1889 | Holt | 29/30 |
| 493,542 A | 3/1893 | Bessing et al. | |
| 660,477 A | 10/1900 | Wellman | 212/129 |
| 673,317 A | 4/1901 | Cole et al. | |
| 840,859 A | 1/1907 | Morse | 78/19 |
| 1,140,839 A | 5/1915 | Moore | |
| 1,218,044 A | 3/1917 | Beaman | 409/158 |
| 1,256,072 A | 2/1918 | Stevenson | 77/6 |
| 1,256,073 A | 2/1918 | Stevenson | 77/6 |
| 1,429,012 A | 9/1922 | Andrews | 212/17 |
| 1,522,600 A | 1/1925 | Strickland | |
| 1,629,184 A | 5/1927 | Thomas | 212/130 |
| 1,631,927 A | 6/1927 | Dietrich | |
| 1,674,100 A | 6/1928 | Fitch | |
| 1,729,891 A | 10/1929 | Moore | 212/128 |
| 1,837,718 A | 12/1931 | Kendall et al. | |
| 1,960,900 A | 5/1934 | Drexler | 89/42 |
| 1,979,473 A | 11/1934 | Klausmeyer | 77/28 |
| 2,017,865 A | 10/1935 | Morgan | 192/125 |
| 2,028,008 A | 1/1936 | Peyinghaus | 29/33 D |
| 2,043,293 A | 6/1936 | Jennings | 243/16 |
| 2,092,142 A | 9/1937 | Schuz | |
| 2,095,267 A | 10/1937 | Riverman | 268/63 |
| 2,102,995 A | 12/1937 | Coombs | 214/16.1 |
| RE20,630 E | 1/1938 | Hallenbeck | 212/132 |
| 2,139,403 A | 12/1938 | Cole | 29/33 |

| Patent No. | Kind | Date | Inventor | Class |
|---|---|---|---|---|
| 2,139,772 | A | 12/1938 | Ringe | 212/21 |
| 2,183,055 | A | 12/1939 | Vanderpool | 51/166.9 |
| 2,238,921 | A | 4/1941 | Waldsmith | 29/33 |
| 2,245,932 | A | 6/1941 | Miller | 118/324 |
| 2,249,230 | A | 7/1941 | Schafer | 77/3 |
| 2,254,285 | A | 9/1941 | Harris et al. | 212/312 |
| 2,286,571 | A | 6/1942 | Pollard | 91/45 |
| 2,310,870 | A | 2/1943 | Retterath | 77/28 |
| 2,353,394 | A | 7/1944 | Farmer | 211/49 |
| 2,363,208 | A | 11/1944 | Sulzer | 164/115 |
| 2,386,520 | A | 10/1945 | Watson et al. | 45/2 |
| 2,423,440 | A | 7/1947 | Neergaard | 178/19 |
| 2,428,856 | A | 10/1947 | Sinclair | 104/50 |
| 2,451,368 | A | 10/1948 | White et al. | 214/95 |
| 2,475,245 | A | 7/1949 | Leaver et al. | 318/162 |
| 2,479,293 | A | 8/1949 | Bayless | 77/5 |
| 2,480,835 | A | 9/1949 | Burgwin et al. | 250/41.5 |
| 2,489,811 | A | 11/1949 | Perkins | 51/147 |
| 2,508,086 | A | 5/1950 | Alvarez | 198/38 |
| 2,522,031 | A | 9/1950 | Gavin, Sr. | 22/79 |
| 2,522,613 | A | 9/1950 | Harrison et al. | 51/185 |
| 2,529,804 | A | 11/1950 | Harnischfeger et al. | 250/2 |
| 2,537,770 | A | 1/1951 | Livingston et al. | 318/162 |
| 2,558,300 | A | 6/1951 | Knapp | 51/147 |
| 2,575,792 | A | 11/1951 | Ballard | 90/13 |
| 2,576,341 | A | 11/1951 | Hanitz | 409/158 |
| 2,580,472 | A | 1/1952 | Smith | 214/1 |
| 2,587,686 | A | 3/1952 | Berry | 209/81 |
| 2,622,375 | A | 12/1952 | Haas | 51/108 |
| 2,623,626 | A | 12/1952 | Dittola | 198/21 |
| 2,624,122 | A | 1/1953 | Knobel | 33/164 |
| 2,641,042 | A | 6/1953 | Kopp | 25/107 |
| 2,646,177 | A | 7/1953 | Nussbaum et al. | 214/11 |
| 2,647,647 | A | 8/1953 | Alimanestiano | 214/16.1 |
| 2,656,497 | A | 10/1953 | Schweighofer | |
| 2,665,013 | A | 1/1954 | Socke | 214/1 BS |
| 2,678,025 | A | 5/1954 | Starky | 118/500 |
| 2,679,940 | A | 6/1954 | Goertz, et al. | 214/1 |
| 2,690,532 | A | 9/1954 | Johnson | |
| 2,691,448 | A | 10/1954 | Lontz | 214/16.1 |
| 2,694,154 | A | 11/1954 | Kingsbury | 250/219 |
| 2,696,375 | A | 12/1954 | Perkins | 51/147 |
| 2,696,921 | A | 12/1954 | Desjardins | 214/16.1 |
| 2,697,529 | A | 12/1954 | Hubbell et al. | 214/16.4 |
| 2,707,666 | A | 5/1955 | Becker | 312/319 |
| 2,717,086 | A | 9/1955 | Bush | 214/11 |
| 2,729,943 | A | 1/1956 | Clarke et al. | 60/97 |
| 2,736,671 | A | 2/1956 | Ransburg | 118/323 |
| 2,745,167 | A | 5/1956 | Cross | 29/33.12 |
| 2,748,544 | A | 6/1956 | Narel et al. | 51/105 |
| 2,761,570 | A | 9/1956 | Benson et al. | 212/136 |
| 2,769,280 | A | 11/1956 | Comstock | 51/32 |
| 2,782,691 | A | 2/1957 | Feagans | 90/13 |
| 2,785,535 | A | 3/1957 | Alcorn, Jr. et al. | 60/97 |
| 2,803,333 | A | 8/1957 | Freeman | 198/38 |
| 2,807,383 | A | 9/1957 | Scheltens | 214/731 |
| 2,811,267 | A | 10/1957 | Bock | 214/151 |
| 2,820,187 | A | 1/1958 | Parsons et al. | 318/39 |
| 2,822,094 | A | 2/1958 | Greer | 212/127 |
| 2,834,156 | A | 5/1958 | Oberlin | 49/48 |
| 2,847,131 | A | 8/1958 | Miller | 214/16.1 |
| 2,861,700 | A | 11/1958 | James | 214/1 |
| 2,861,701 | A | 11/1958 | Bergsland et al. | 214/1 |
| 2,882,476 | A | 4/1959 | Wetzel | 318/162 |
| 2,883,912 | A | 4/1959 | Billman et al. | 90/13 |
| 2,884,113 | A | 4/1959 | Converse et al. | 198/19 |
| 2,903,120 | A | 9/1959 | Thomas | 198/19 |
| 2,921,487 | A | 1/1960 | Schabot | 77/64 |
| 2,927,258 | A | 3/1960 | Lippel | 318/39 |
| 2,947,203 | A | 8/1960 | Ausenda et al. | 77/5 |
| 2,964,459 | A | 12/1960 | Dearson | 294/116 X |
| 2,986,261 | A | 5/1961 | Wenstrand | 198/21 |
| 2,988,237 | A | 6/1961 | Devol, Jr. | 214/11 |
| 2,997,154 | A | 8/1961 | Lahm et al. | 198/19 |
| 3,002,615 | A | 10/1961 | Lemelson | 207/2 |
| 3,010,371 | A | 11/1961 | Riedel et al. | 90/21 |
| 3,017,984 | A | 1/1962 | Willard et al. | 198/29 |
| 3,049,247 | A | 8/1962 | Lemelson | 314/16.4 |
| 3,052,140 | A | 9/1962 | Guyer, Jr. | 77/5 X |
| 3,052,999 | A | 9/1962 | Sedgwick et al. | 40/2.2 |
| 3,054,333 | A | 9/1962 | Brainard et al. | 90/56 |
| 3,055,612 | A | 9/1962 | Stout et al. | 243/13 |
| 3,071,262 | A | 1/1963 | Bosch et al. | 214/16.4 |
| 3,088,197 | A | 5/1963 | Cargill | 29/200 |
| 3,099,873 | A | 8/1963 | Brainard et al. | 29/26 |
| 3,106,612 | A | 10/1963 | Lemelson | 179/6 |
| 3,113,404 | A | 12/1963 | Narel et al. | 51/105 |
| 3,119,501 | A | 1/1964 | Lemelson | 214/16.4 |
| 3,145,291 | A | 8/1964 | Brainerd | 235/61.11 |
| 3,154,979 | A | 11/1964 | Crispin | 29/33 P |
| 3,173,175 | A | 3/1965 | Lemelson | 18/26 |
| 3,191,294 | A | 6/1965 | Daugherty | 29/568 |
| 3,198,043 | A | 8/1965 | Davis | 82/53.1 |
| 3,202,443 | A | 8/1965 | Lemelson | 294/88 |
| RE25,886 | E | 10/1965 | Cargill | 29/200 |
| 3,227,012 | A | 1/1966 | Lemelson | 77/65 |
| 3,227,290 | A | 1/1966 | Lemelson | 214/1 |
| 3,227,805 | A | 1/1966 | Lemelson | 178/6.6 |
| 3,229,656 | A | 1/1966 | Bodey | 114/0.5 |
| RE25,956 | E | 2/1966 | Williamson | 90/11 |
| 3,238,615 | A | 3/1966 | Leone et al. | 29/568 |
| 3,243,178 | A | 3/1966 | Williamson et al. | 269/58 |
| 3,244,337 | A | 4/1966 | Curtze et al. | 83/7 X |
| 3,245,144 | A * | 4/1966 | Kumagai et al. | 29/563 |
| 3,247,978 | A | 4/1966 | Neumeier | 214/1 |
| 3,251,255 | A | 5/1966 | Bauman | 83/295 |
| 3,259,958 | A | 7/1966 | Lemelson | 29/26 |
| 3,260,349 | A | 7/1966 | Vander Meer | 198/38 |
| 3,266,141 | A | 8/1966 | Jacobson et al. | 29/568 |
| 3,269,233 | A | 8/1966 | Lothman | 82/14 |
| 3,271,840 | A | 9/1966 | Solski et al. | 29/33 |
| 3,272,347 | A | 9/1966 | Lemelson | 214/1 |
| 3,272,975 | A | 9/1966 | Csech | 235/151.11 |
| 3,273,235 | A | 9/1966 | Dziedzic et al. | 29/568 |
| 3,280,659 | A * | 10/1966 | Allen | 408/3 |
| 3,283,918 | A | 11/1966 | Devol | 214/1 |
| 3,285,437 | A | 11/1966 | Lemelson | 214/16.4 |
| 3,286,595 | A | 11/1966 | Wollenhaupt | 483/32 |
| 3,310,855 | A | 3/1967 | Orioli | 25/107 |
| 3,312,370 | A | 4/1967 | Kolarich et al. | 221/13 |
| 3,313,014 | A * | 4/1967 | Lemelson | 29/33 P |
| 3,346,894 | A | 10/1967 | Lemelson | 10/128 |
| 3,372,568 | A | 3/1968 | Lemelson | 72/218 |
| 3,387,723 | A | 6/1968 | Lemelson | 214/16.4 |
| 3,389,814 | A | 6/1968 | Lemelson | 214/16.4 |
| 3,412,431 | A | 11/1968 | Lemelson | 18/26 |
| 3,426,339 | A | 2/1969 | Rich et al. | 179/100.2 X |
| 3,465,298 | A | 9/1969 | La Duke et al. | 340/172.5 |
| 3,469,611 | A | 9/1969 | Dunlap | 144/144 |
| 3,474,919 | A | 10/1969 | Lemelson | 214/16.4 |
| 3,486,640 | A | 12/1969 | Lemelson | 214/16.4 |
| RE26,770 | E | 1/1970 | Lemelson | 29/33 |
| 3,497,088 | A | 2/1970 | Lemelson | 214/16.4 |
| 3,513,993 | A | 5/1970 | Lemelson | 214/16.4 |
| RE26,904 | E | 6/1970 | Lemelson | 214/1 |
| 3,519,148 | A | 7/1970 | Lemelson | 214/16.4 |
| 3,519,151 | A | 7/1970 | Lemelson | 214/16.4 |
| 3,520,424 | A | 7/1970 | Lemelson | 214/16.4 |
| 3,530,571 | A | 9/1970 | Perry | 29/563 |
| 3,543,392 | A | 12/1970 | Perry et al. | 29/563 |
| 3,547,797 | A | 12/1970 | Haggerty | 204/224 |
| 3,559,256 | A * | 2/1971 | Lemelson | 29/33 P |
| 3,559,257 | A | 2/1971 | Lemelson | 29/33 |
| 3,576,540 | A | 4/1971 | Fair et al. | 340/172.5 |
| 3,854,889 | A * | 12/1974 | Lemelson | 29/33 P |
| 4,016,540 | A | 4/1977 | Hyatt | 340/172.5 |

| | | | |
|---|---|---|---|
| 4,369,563 A | * | 1/1983 | Williamson ................... 29/563 |
| 4,369,563 A | * | 5/1986 | Williamson ................... 29/563 |
| 4,621,410 A | * | 11/1986 | Williamson ...................... 483/1 |
| 4,636,137 A | | 1/1987 | Lemelson ................... 414/730 |
| 4,773,815 A | | 9/1988 | Lemelson ............... 414/744 A |
| 5,017,084 A | | 5/1991 | Lemelson ................ 414/744.3 |
| 6,708,385 B1 | | 3/2004 | Lemelson ................... 29/563 |

FOREIGN PATENT DOCUMENTS

| | | |
|---|---|---|
| DE | 1477681 | 1/1969 |
| GB | 404617 | 1/1934 |
| GB | 717018 | 10/1954 |
| GB | 902069 | 7/1962 |

OTHER PUBLICATIONS

"First US Tape-Controlled Line Goes Into Production at Hughes-El Segundo," American Machinist, Mar. 24, 1958, p. 98.*

"The Line that made Headlines," American Machinst, by William Wagensiel, May 5, 1958, pp. 107-109.*

Google.com, Flexible Manufacturing.*

Author Unknown, Title unkonwn, pages from a Russian book, pp. 260-265, date unknown. (translation).

"Advanced Methods Used In Creating Computer Microcircuits," *Automation*, pp. 84-89, Jan. 1966.

"Advanced Numerical Control Applications," *Tooling & Production*, pp. 75-76, Mar. 1966.

"Electronically Controlled Machine-Tool Production Line," *Science Digest*, p. 84, Jun. 1958.

"IBM Buys Its Own Sales Pitch," *Production*, pp. 140-146, Oct. 1965.

"Making Printed Circuit Panels," *Automation*, pp. 66-74, Jan. 1967.

"New Concept of Manufacture," *The Engineer*, Sep. 15, 1967.

"Numerical Control's Third Generation," *Metalworking Production*, Sep. 13, 1967.

"On-Line Computers Control Circuit Production," *Machinery*, pp. 91-95, Dec. 1965.

"Punched-Tape Units Control New Type Transfer Line," *Iron Age*, pp. 106-108, Mar. 20, 1958.

"A Step Toward the 'Automatic Factory'," *Production*, pp. 75-79, Jul. 1965.

"Tape Controlled Transfer Machine," *Automation*, Jun. 1958.

Backe, W. and Rohs, H.G., "Adapting Machine Tools to the Needs of Control with Numeric Data Input," *Werkstattstechnik*, pp. 209-219, vol. 54, No. 5, 1964. (translation).

Williamson, D.T.N., "Molins System 24—A New Concept of Manufacture," *Machinery and Production Engineering*, Sep. 13, 1967.

Williamson, D.T.N., "Molins System 24—A New Concept of Manufacture," *Machinery and Production Engineering*, Oct. 25, 1967.

Williamson, D.T.N., "A New Pattern of Batch Manufacture," *Materials and Methods*, Jul. 1968.

Williamson, D.T.N., *System 24—A New Concept of Manufacture*, Proceedings of the 8th International M.T.D.R. Conference, May 1968.

An Ozzie Glover Production, videotape entitled *Industrial Breakthrough*, Industrial Systems Division of Hughes Products, asserted to depict a production line that was publically unveiled on Mar. 11, 1958.

* cited by examiner

*Primary Examiner*—Derrris H. Banks
(74) *Attorney, Agent, or Firm*—Louis J. Hoffman; Steven G. Lisa

(57) ABSTRACT

A machine tool apparatus is provided employing a plurality of tool heads which may be sequentially or simultaneously automatically controlled to perform preprogrammed operations on either the same or different workpieces. In one form, a plurality of tool heads are supported on the same frame, guideway or track and may be separate prepositioned or driven under remote or automatic control to perform preprogrammed operations wither in sequence or simultaneously on the same workpiece or simultaneously on separate workpieces spaced apart on a common conveyor such as a flight conveyor while the conveyor is either in motion or stationary.

In another form, the conveyor is automatically stopped with units of work thereon, each disposed so as to be predeterminately located with respect to a respective machine tool which has been prepositioned adjacent the work-holding conveyor. In yet another form, at least certain of the machine tools are movable parallel to the work-holding conveyor so that they may be predeterminately moved prior to and/or during operations on work.

In yet another form, means are provided for transferring units of work from the work-holding conveyor to temporary platforms adjacent certain of the respective machine tools so that each tool may perform automatic operations on work while the work-holding conveyor remains operating.

43 Claims, 5 Drawing Sheets

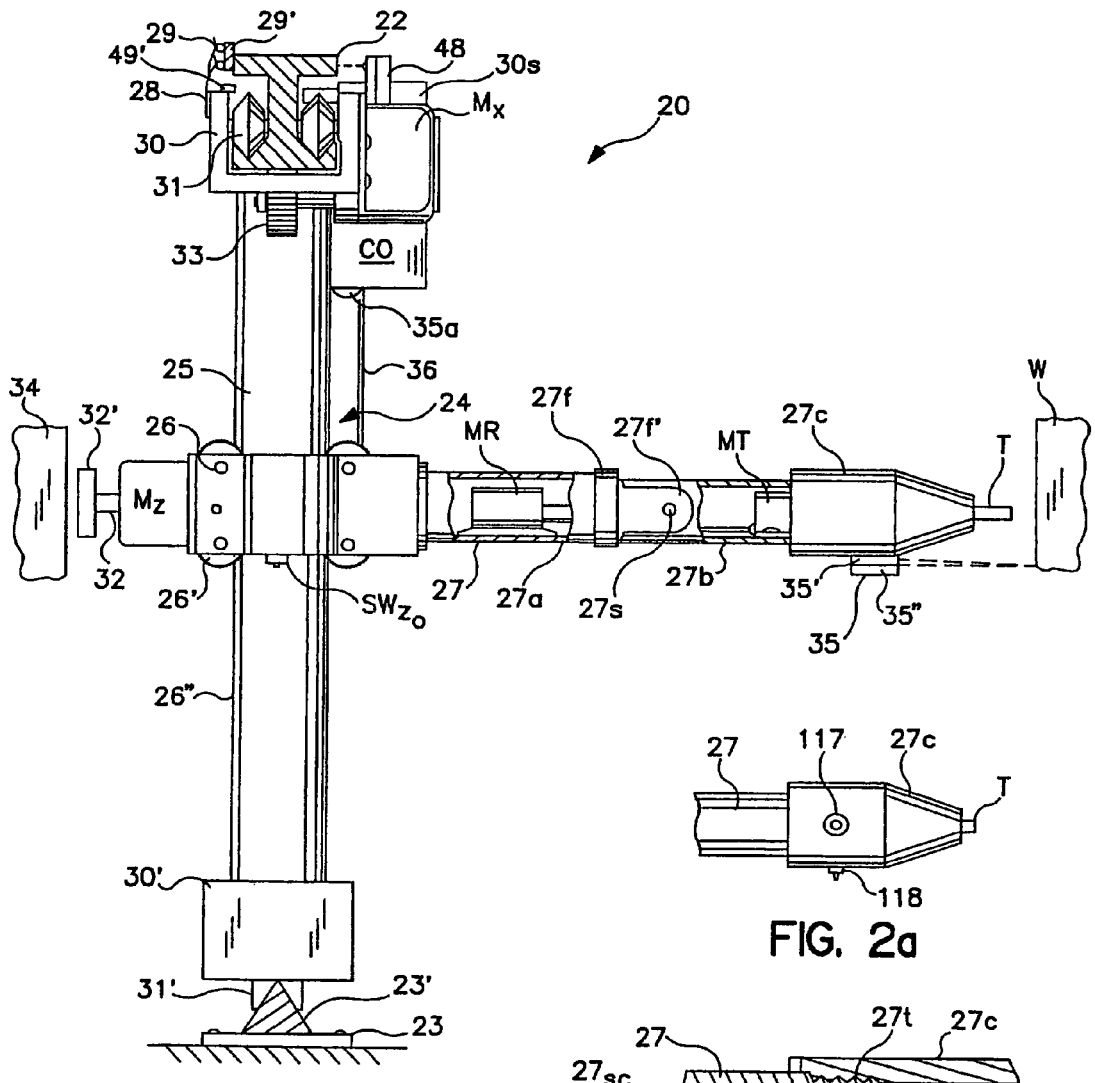
FIG. 2
FIG. 2a
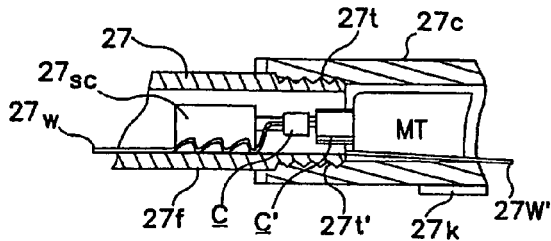
FIG. 2b

MACHINE TOOL METHOD

RELATED APPLICATIONS

This is a continuation of application Ser. No. 06/251,656, filed Apr. 6, 1981, now abandoned which is a continuation of application Ser. No. 05/091,908 filed Nov. 6, 1979, now abandoned, which is a continuation of application Ser. No. 05/107,357 filed Jan. 18, 1971, now abandoned, which is a continuation-in-part of:

a) application Ser. No. 05/858,560 filed Aug. 29, 1969, now U.S. Pat. No. 3,854,889, which is a continuation of application Ser. No. 05/629,758 filed Apr. 10, 1967, now abandoned, which is a continuation-in-part of application Ser. No. 05/465,812 filed Apr. 8, 1965, now U.S. Pat. No. 3,313,014, which is a continuation-in-part of application Ser. No. 05/152,702 filed Oct. 17, 1961, now abandoned, which is a divisional of application Ser. No. 03/449,874 filed Jul. 28, 1954, now abandoned, and b) each of the applications Ser. No. 04/712,443 filed Mar. 12, 1968, now U.S. Pat. No. 3,559,256, and Ser. No. 05/717,065 filed Mar. 12, 1968, now U.S. Pat. No. 3,559,257; each of said applications Ser. Nos. 04/712,443 and 05/717,065 being a continuation-in-part of application Ser. No. 04/387,954 filed Aug. 6, 1964, now U.S. Pat. No. 3,372,568, which is a continuation-in-part of application Ser. No. 04/219,357 filed Aug. 13, 1962, now abandoned, which is a continuation-in-part of application Ser. No. 03/557,415 filed Apr. 10, 1956, now U.S. Pat. No. 3,049,247, which is a continuation-in-part of the applications Ser. No. 03/477,467 filed Dec. 24, 1954, now abandoned, and Ser. No. 03/449,874 filed Jul. 28, 1954, now abandoned.

SUMMARY OF THE INVENTION

This invention relates to an automatic production apparatus and method for producing products employing a plurality of remotely controlled machine tools operative to perform preprogrammed operations in sequence and in certain instances simultaneously on the same workpiece. Heretofore, machine tools have been automatically controlled to perform either the same repetitive operation on the same workpiece or, if the machine tools have been program controlled by means such as a numerical controller or computer, it has been required that the same type of workpiece be sent to each machine for performing similar operations on each unit until the machine can be reprogrammed to perform different operations. Accordingly, it is a primary object of this invention to provide an automatic production apparatus including a plurality of production machines, each of which is separately program controllable and simultaneously operable on either the same or different workpieces whereby the total time required to operate on a specific workpiece is substantially reduced.

Another object is to provide an automatic production apparatus including a transport means for a power operated tool and control means for said tool which is operative to permit the initiation and performance of predetermined operations on a workpiece without the need for precisely positioning the work relative to the transport means.

Another object is to provide a new and improved automatic production apparatus having a plurality of self-propelled machine tools movable along a common guide or trackway and each program controllable in its operation to operate on work from any selected location on said trackway whereby two or more separate machine tool units may perform predetermined operations relative to a single workpiece or a plurality of workpieces of different sizes and shapes.

Another object is to provide an automatic production system having a plurality of machine tools each of which is separately positionable along a common guide or trackway so as to permit each tool to perform varied operations on not only units of conventional work to be machined but also large work assemblies.

Another object is to provide a new and improved automatic production system having a common carrier or guideway means for a plurality of different production tools including tools for performing operations which conventionally require both automatic machine tool operation and manual operations such as machining, finishing, assembling, fastening, inspection and transfer of both semi-finished and finished goods to and from their production area or line thereby totally eliminating the need for manual labor to produce certain assemblies currently requiring a substantial amount of same.

BRIEF DESCRIPTION OF DRAWINGS

With the above and such other objects in view as may hereafter more fully appear, the invention consists of the novel constructions, combinations and arrangements of parts as will be more fully described and illustrated in the accompanying drawing, but it is to be understood that changes, variations and modifications may be resorted to which fall within the scope of the invention as claimed.

In the drawings:

FIG. 2 is a side view of one form of machine or tool which may be controlled by the system defined in FIG. 1;

FIG. 2' illustrates modified features applicable to the machine illustrated in FIG. 1;

FIG. 2" is a fragmentary sectional view of a means for coupling a tool assembly to an arm fixture assembly in accordance with the invention;

FIG. 3' is a schematic diagram illustrating a modification to the control system of FIG. 3;

DETAILED DESCRIPTION

Figure 1:
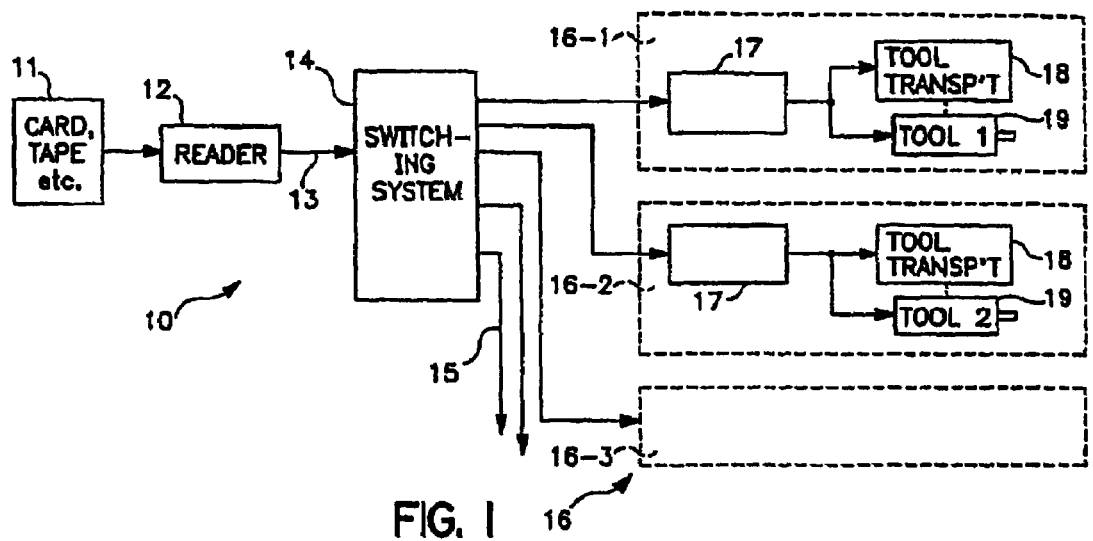
FIG. 1 is a block-diagram of an automatic machine control system broadly defining aspects of the instant invention.

For the purpose of simplifying the drawings and description to follow it is assumed that, where not shown, the correct circuit, power supplies, diodes and the like are provided on the proper sides of all motors, switches, relays, solenoids, counters, and similar devices used for control. Also, any mechanical features or devices not illustrated are assumed to be provided in accordance with available conventional components or assemblies or are illustrated in greater detail in one of my said copending applications.

Provided and described hereafter are systems for effecting the automatic and remote control of one or a plurality of power operated devices which are electrically controlled by remotely generated digital recordings comprising portions of what will be referred to as command control messages. A command control message is defined as one made up of different message units each of which is a portion of the entire message and contains, in addition to one or more discrete groups of digital signals or pulse trains, one or more digital and/or tone signals operative to effect the selective gating of a command control portion of said message unit to a particular controller or control device in the system for activating or presetting said control device. The separate messages may thus each comprise (a) a series of pulse trains or digital codes generated as electrical signals of the same frequency, (b) a series of pulse trains or codes having interposed between certain of said codes, tone signals of different frequencies which are operative to energize different code responsive or tone responsive relays in the control system for gating a respective portion or code unit of the remainder of the message to a respective control device for energizing or presetting same in accordance with the digital value of the gated code or (c) a series of tone signals of different frequencies with certain of said tones being operative to effect the gating of other tone signals to preset or energize controls in the system responsive only to respective tone signals. Thus, while the switching means described hereafter may be defined as code responsive or coded relays responsive to code portions of the command control message, they may also comprise tone relays responsive to specific frequency tones disposed between other digital code, pulse train or tone portions thereof operative to effect control of the operation of the tool and the motor means positioning the tool relative to the work on which it performs.

Command control messages may also be composed of different codes or control tones which are transmitted simultaneously in which said codes comprise pulse trains or groups of digital signals each of a different frequency. The groups of tones or tone codes may be recorded as they are transmitted on a single channel of the magnetic recorder of the machine or station to which they have been gated and separated thereafter by the proper filter means. Thus, they may be independently used for control of respective servos or filtered from one another and independently recorded on different channels of a multi-channel recorder or utilized upon separation from the single signal to preset respective predetermining means as described hereinafter.

FIG. 1 shows elements of an automatic production system or apparatus 10 having a plurality of power operated tools and devices 19 each of which is remotely controllable to perform a specific function or functions relative to work in process, equipment or facilities in operation. At a location remote from said power operated devices 19, a source 11 of input command signals is operatively connected to a scanning device or reader 12. The command signals which control one or more of said power operated devices 19 may be provided as digital recordings or the like on one or more of a plurality of cards, tapes, discs or other recording media which are scanned by photoelectric, magnetic, mechanical switches or other scanning means referred to as reader 12. The result of scanning is generated as a plurality of digital signals on the output 13 of reader 12 which are transmitted as one or more command messages which are individually transmitted and routed to respective receivers associated with selected of the plurality of power operated devices 19.

Transmission of the signals generated on the output of scanner or reader 12 may be accomplished by wire or short wave means. In FIG. 1, the output 13 is connected by wire to a switching system 14 such as an automatic telephone switching system which is operative by the first portion of the message generated in reader 12 to effect switching of the remainder of the message on a selected of a plurality of outputs 15 thereof to a selected machine or tool station generally designated 16. In other words, a plurality of tools or tool stations designated 16-1, 16-2, 16-3, etc. may be provided in the system 10 illustrated in FIG. 1, any one or more of which may receive a particular command control message in accordance with the switching and connection portion of the message which is first generated and transmitted to switching system 14. Each of the plurality of tools or power operated devices 19 is activated through an assembly including a receiver-controller 17 which is operative to receive and record or otherwise utilize command control messages destined to automatically control the machine tool or device associated therewith. The receiver and controller 17 of each tool preferably includes a recording means for a plurality of command control messages and means presettable by a particular message for predetermining the operation of a tool transport means 18 and the tool 19 itself.

The transport means 18 may comprise one or more motor driven fixtures for prepositioning one or more power operated devices 19 in sequence with their operation as controlled by the output of receiver and controller 17. The power operated devices 19 for each unit or station 16 may vary from single or multiple open-loop tools such as motor driven drills, riveters, welding tools, mills, buffers, grinders, material applicators, such as sprayers or the like. They may also comprise assembly and/or disassembly tools for fasteners or components associated with a machine, component or work in process which is positioned in the realm of operation of the power operated devices 19. Other open-loop devices may also include scanning and inspection machines and apparatus such as X-ray, ultrasonic, electron-beam or other radiant energy devices operative to inspect a predetermined portion of a workpiece or assembly or to machine, weld, or otherwise operate thereon in accordance with movement and operation thereof as controlled by the command control message or messages transmitted to the receiver and controller 17.

Tools of the type described may also be operative in a closed-loop system which includes one or more feedback signal generating means operative in response to signals generated with the movement of the tool, its operation and/or by scanning that portion of the work affected by the tool or device 19.

FIG. 2 shows an automatic production tool T and a transport or positioning means therefore which is applicable to perform various operations controlled by command signals generated remote therefrom. The automatically operative apparatus, generally designated 20, includes guide means for a tool carriage assembly 24 in the form of an overhead mounted track 22 and a floor mounted track 23 extending adjacent to one or more workpieces or assemblies W disposed along the path of the parallel tracks 22 and 23. The tracks 22 and 23 may be fixed within a given work area and may comprise one of a plurality of such tracks, each mounting a respective tool carriage assembly 24 or may be mounted on a further frame or tool base which is movable to a particular production or maintenance location by automatic or manually directed means.

Supporting the assembly 24 from above is a first support carriage 30 having a plurality of wheels 31 rotationally supported thereon which ride in respective V-shaped grooves in the bottom legs of the I-beam shaped track 22 along which the tool assembly 24 is movable for positioning the tool T thereof at different locations defined by the extension of tracks 22 and 23. Extending between the upper support carriage 30 and a lower support carriage 30' is a vertical fixture or column 25 supporting a second support carriage 26 which is movable up and down along column 25.

A first motor Mx is mounted on carriage 30 and is operative to drive said carriage 30 longitudinally along track 22. The output shaft of gear motor Mx mounts a drive wheel 33 which may frictionally engage the lower surface of track 22 or may contain a plurality of teeth engaging a spur gear portion of the lower surface of track 22 (not shown). A single wheel 31' has a wedge-like peripheral indentation which rides on a wedge-shaped upwardly extending portion 23' of track 23 for supporting the assembly 24 in fixture relation thereon.

Carriage 26 is driven up and down on column 25 by any suitable electrically controllable drive means mounted either on said carriage 26 or the remainder of the assembly. In FIG. 2, a plurality of toothed wheels 26' are shown rotationally mounted on carriage 26 and are driven by a motor Mz also mounted thereon, to engage one or more spur gear toothed portions. Shown laterally extending from support carriage 26 is a fixture assembly 27 including a first arm 27a and a second arm 27b mounted for movement relative to arm 27a. Carriage 26 is secured to the end of assembly 27. A fitting 27f containing a plurality of fork-like elements 27f' pivotally supports arm assembly 27b on a shaft or pins 27s. A motor MR mounted within arm 27a, is operative to pivot arm 27b about the axis of aligned pins 27s under the control of the computing means to be described. Mounted near the end of arm 27b is a tool assembly 27c containing a tool or other power operative device T. The tool assembly 27c is preferably removable from the end of 27b as shown in my said applications of which this is a continuation-in-part, so as to permit different tools to be operated by the apparatus illustrated by the performance of minor changeover functions therefor.

In addition to the provision of one or more workpieces, machines or assemblies W disposed at different locations adjacent to track 22 to be selectively operated on by the tool T of the assembly 24 in accordance with a programmed sequence of movements and operations, a means 34 in the form of one or more assemblies or supports is provided adjacent one or more of the work members W or extending parallel to the track 22 which serves as a bucking member for the tool T. Shaft 32 of a lineal servo is mounted on or within the housing which supports motor Mz and operative to be projected against the adjacent surface of member 34 during the operation of the tool T to serve as a support or bucking means for the tool T and/or a means for prepositioning tool T relative to the work. The head 32' at the end of shaft 32 engages member 34 and transmits axial forces directed therethrough from the tool T to member 34. Operation of head 321 to project against member 34 is preferably program controlled by the same means controlling the various servo motors such as Mx, Mz, MR and MT.

All of the components operative to control both prepositioning and operation of the one or more tools T mounted on the assembly 24 are mounted in housing CO. Such components operate in accordance with a programmed input originating as one or more command control messages transmitted thereto from a remote location as will be hereinafter described.

Other features of the apparatus of FIG. 2 include a plurality of wires 29 which are supported off track 22 by a plurality of insulating spacers 29'. An assembly 28 of slides or brush elements which are insulatedly supported by carriage 30 and movably engage respective of the plurality of wires 29 for the transmission of electrical energy to the various servo motors mounted on apparatus 20 and of signals operative to control said motors.

A retractor reel 35a of electrical cable 36 extends between housing CO and the various motors mounted on the carriage 26 and the tool fixture assembly 27 extending therefrom. The retractor reel 35a is operative to retract cable 36 when carriage 26 moves upwardly and to permit the paying out of cable 36 when carriage assembly 24 moves downwardly.

Scanning and switching controls for the apparatus 20 which will hereinafter be described in greater detail, include a photoelectric cell relay 48 mounted on carriage 30 and operative to scan a grid, marks or reflective markers disposed along the edge of the upper leg of the I-beam track 22. Mounted on the other wall of carriage 30 is a limit switch 49' adapted to be activated by a pin or pins projecting from track 22. Either or both these scanners may be mounted on the lower carriage 30' to define means for controlling movement of the assembly 24 along the path defined by both tracks.

A photoelectric scanning relay 35 is shown secured to the housing of tool assembly 27c for the tool T disposed at the end of arm fixture assembly 27 and is operative to scan and detect the work surface, portions thereof, reflective markers or other means disposed on or adjacent to the work or its holding fixture. The relay 35 preferably includes a photoelectric cell disposed in a first housing or compartment 35' adjacent to a light source disposed in a second compartment 35" and adapted to project a beam of light substantially parallel to the scanning axis of the photoelectric cell so that the cell may become energized upon detecting the light from said light source after its reflection off the surface of the work being scanned. The photoelectric relay 35 may be utilized for merely detecting the appearance of a portion of the workpiece such as an edge thereof as it comes into alignment with the projected light beam. It may also be utilized for effecting fine adjustment and positional control of the tool positioning fixture in scanning narrow retroreflective markers or grid lines disposed on a reflex reflecting surface such as the commercially available Scotch Lite.

FIG. 2' illustrates the fixture assembly 27 of FIG. 2 modified with a plurality of limit switches 117 and 118 mounted on and projecting in different directions from the housing of tool assembly 27c. A first limit switch 117 is adapted, with its actuator arm projecting laterally and horizontally outward therefrom, to engage a vertical surface of a workpiece, housing of a machine or the like. A second limit switch 118 is mounted on assembly 27c with its actuator arm projecting vertically downward and is adapted to effect automatic control of the apparatus as will hereinafter be described when it engages a horizontal surface such as the top of the workpiece or a lateral projection thereof. Other means may also be utilized for sensing workpiece or workmount surfaces such as magnetic means or means such as photoelectric relay 35 adapted to detect the reflection of a light source off the surface of the workpiece.

As stated, the tool or device T positioned by the apparatus 20 in the realm of movement of the arm fixture assembly 27 may comprise various forms of electrically controlled power operative devices for performing one or more of a plurality of production machining, assembly or inspection functions, material handling or maintenance functions. These devices may include various tools adapted to shape or machine the work such as drills, mills, saws, grinders, buffers, punchers and shapers or the like; various assembly devices including welding tools, riveters and other fastener applicators adapted to be automatically prepositioned and operated in a programmed fashion on the work; various inspection devices including radiation devices such as light, X-ray, magnetic field measurement, electron beam measurement and cathode ray devices such as a television camera of photomultiplier device and various maintenance tools including wrenches, screwing and unscrewing devices, manipulators for valves, dials and arms projecting from the piping or devices to be controlled thereby; manipulator jaws or the like.

In FIG. 2 motor MR is operative to pivot the arm 27b on arm 27a. This servo motor MR may also be operative to project and retract 27b with respect to arm 27a or to rotate 27b about the longitudinal axis of arm 27a. In other words, various combinations of rotary and lineal servo devices are conceived as applicable to the arm fixture assembly 27 as illustrated or to various modifications thereof depending on the production functions required of the apparatus. If servo MR is a gear motor operative to rotate 27b about the longitudinal axis of arm 27a, then the automatic control means described hereinafter may be operative to effect the automatic assembly and disassembly of various tool housings and the different tools held thereby with the end of arm 27b, particularly if assembly is effected by threading means in which tool assembly 27c is screwed onto the end of arm 27b.

A fixture for holding a plurality of tools T located in different housings of tool assembly 27c may be prepositioned relative to the track 22 so that command message control of the operation of motor Mx after controlling Mz to position carriage 26 at the proper height, may be operative to effect the disassembly of one housing of tool assembly 27c already mounted on the end of arm 27b and its placement in a predetermined is location on said fixture and the automatic assembly thereon of a selected tool housing which is at a predetermined location on said fixture.

FIG. 2″ shows details of the coupling means at the end of arm fixture assembly 27 such as arm 27b operative to both secure the tool assembly 27c thereto and electrically connect the devices secured therein to the electrical circuitry of the fixture assembly 27 and the power and control means located in housing CO. The arm or column defining the end of fixture assembly 27 has a threaded end 27t for removably securing it to the threaded end 27t' of the housing or mount of tool assembly 27c, which function may be performed automatically as described by rotating either or both assemblies after their signal controlled alignment with each other. Electrical connection of components MT or others mounted within the housing of tool assembly 27c may be effected by the provision of aligned contact members at the end of fixture assembly 27 and within tool assembly 27c which contact member engage each other to connect respective circuits of both assemblies when the proper degree of relative rotation of both is effected.

In FIG. 2″ a push-pull, bi-stable solenoid 27sc is secured within fixture assembly 27 near the end thereof and mounts a pluggable electrical connector C at the end of its shaft. Connector C is adapted to engage a receptacle or female electrical connector C' secured within tool assembly 27c upon coupling of assemblies 27 and 27c by the projection of the shaft of solenoid or lineal servo 27sc. A signal operative to project said shaft may be derived from the programmed command control sequence as will be hereinafter described. Thus, the multi-circuit cable 27w extending along the interior of fixture or arm assembly 27 is electrically connected to respective lines of a cable 27w' associated with the housing of tool assembly 27c. Line 27w is shown slack or coiled at its end to permit it to be advanced and retracted with movement of the shaft of the solenoid 27sc and line 27w' may contain power and control circuits operative to energize the various electrical devices such as tool servo MT associated with tool assembly 27c. A key or shaped portion 27k on the housing of tool assembly 27c projects therefrom and is used for aligning and retaining said assembly 27c in its storage fixture and/or is used to rotate and assemble same with fixture assembly 27.

Other features of the apparatus of FIG. 2 include the provision of a servo or solenoid operated means for engaging and locking the carriage 30 against the track 22 to steady and preposition the tool carrier assembly 24 during the performance of a particular production operation thereof. A solenoid 30s mounted on the sidewall of carriage 30 has an actuator arm adapted to project and engage the main rib of the I-beam track 22. Such a device, which may also be mounted on the bottom carriage 30' for the engagement of the track 23, may be automatically controlled to engage and disengage track 22 by respective portions of the command control message, prior to and after tool operation on the work in a predetermined cycle as described hereinafter.

Figure 3:
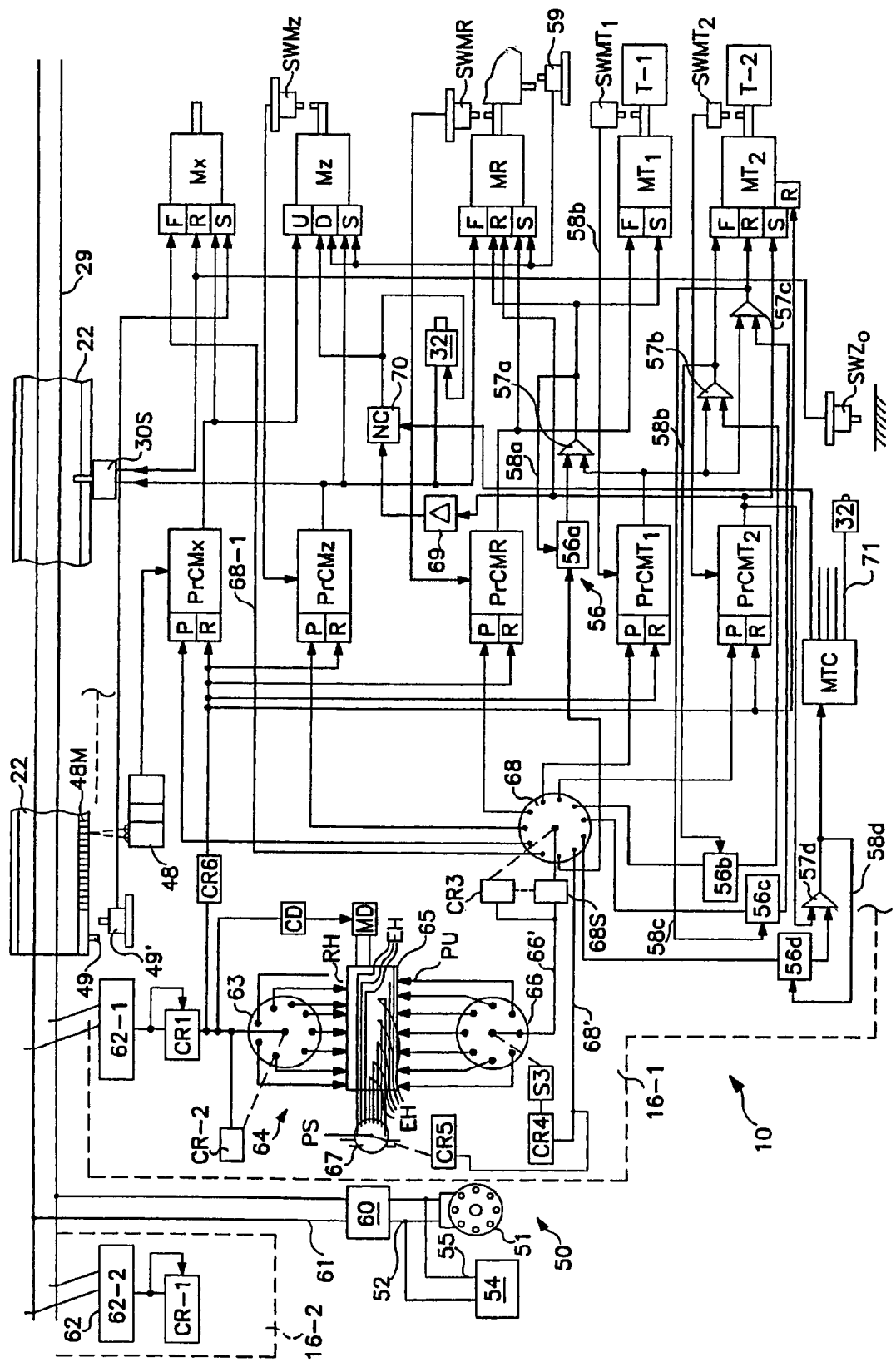
FIG. 3 is a schematic diagram illustrating further details of an automatic control system of the type illustrated in FIG. 1.
Figure 3A:
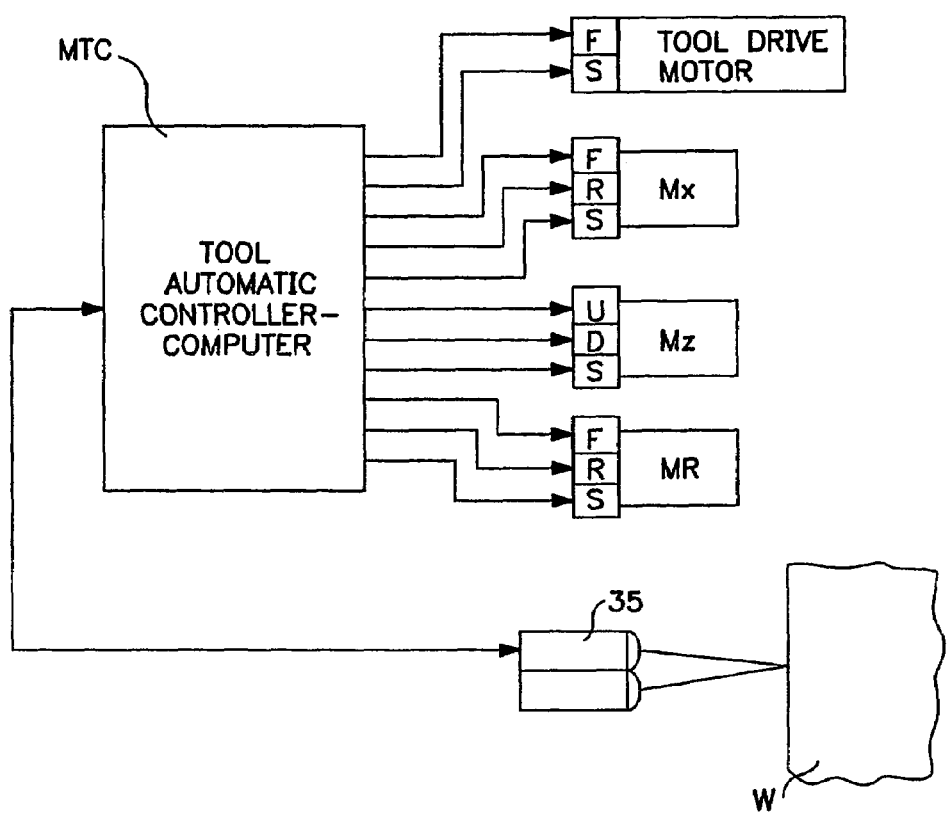

FIG. 3 illustrates further details of a system employing one or more remotely controlled tools or devices as described. A source of command control messages is operative at a station or console, generally designated 50, which is situated remote from the power operated devices controlled thereby. The command control messages may be generated by manual means including a dial operated or push button digital pulse train generating device 51 or a code generating device 54 such as the described card, tape, disc or drum reader having recording elements containing said command control messages which are sequentially scanned in the reader to generate said messages electrical signals. The outputs 52 of device 51 and outputs 55 of device 54 are connected to a signal transmitter 60 which is operative to transmit by short wave or wire 61 the command messages of devices 51 and 54 to a plurality of receivers for power operative production devices in work stations 16-1, 16-2, etc.

Assuming that the command control message generated on the output of transmitter 60 is destined for the power operated devices associated with station 16-1, said message is received by the receiver 62-1 thereof as well as the other receivers 62 of the system but is only gated to the control apparatus coupled to the output of receiver 62-1, to the exclusion of all other control apparatus in the system, by means of a tone or coded relay CR-1 connected across the output of 62-1. The relay CR-1 contains a normally open slow-to-close or bi-stable switch and is operative to close said switch in response to a first portion of the command control message which may be a code or tone of such a characteristic as to activate relay CR-1 to the exclusion of similar types of relays each connected to the output of the other receivers 62 in the system. The remainder of the command control message is then operative to perform the following functions.

The next portion or unit code part of the command control message is passed to a second coded relay CR-2 and is utilized to activate relay CR-2 to energize the switching input of a rotary stepping switch 63 to step said switch to the next switching position or any predetermined switching position. The output of the receiver 62-1 passes through the rotary stepping switch 63 to a selected of a plurality of outputs thereof each of which is connected to a respective recording head RH of a bank of said heads which are positioned to record messages on respective of a plurality of recording tracks of a magnetic recording drum, disc, etc.

The drum 65 is driven by a servo device MD which, in the apparatus illustrated, is operative in one of two selected modes including constant speed rotation of drum 65 or stepping rotation of said drum as will be described hereinafter.

A plurality of reproduction heads PU are operatively coupled to the recording channels of drum 65 permitting the recorder 64 to serve as a source of a plurality of command control messages transmitted thereto from station 50 which messages are selectively reproducible thereform, one after the other or in predetermined sequence, to control the positioning and operation of the one or more power operative devices associated with the assembly or station 16-1. The heads PU are each connected to a respective input of a solenoid or servo driven rotary stepping switch 66. The single output 66' of switch 66 is connected to the input of a second rotary stepping switch 68 for distributing portions of the reproduced command controlled message to various predetermining controllers which are operative for controlling the movement and operation of the one or more power operative devices. The switch 68 is stepped to gate the input 66' to the various outputs thereof by means of a third tone or coded relay CR-3 which operates the servo 68s driving the switch 68 in response to portions of the command control message disposed between the other portions thereof which are utilized for controlling the further control devices coupled to the outputs of 68.

A typical cycle of operation will now be described in order to describe the various control components and features of the particular system illustrated in the drawing. A first portion or code unit of the command control message is gated on line 66' through switch 68 to a predetermining controller PrCMx which is operative to control a first servo motor Mx for positioning the the machine tool in a first direction along guide or track 22. It is assumed that carriage 30 is located at a predetermined position on the track 22 as defined by a home position locator stop or pin 49 and a limit switch 49' mounted on the carriage 30'. Switch 49' is operative when its actuator arm strikes 49 as the carriage 30 moves to said home position to have stopped motor Mx with, for example, an end of track 22. Controller PrCMx may be of the code or pulse-presettable type as described in my said copending application, and is operative to receive a pulse or tone code or predetermined number of digital pulses comprising the portion of the command control message gated thereto Such pulses preset the controller or counter whereby it operates thereafter to generate a stop-signal upon: receipt of a predetermined number of feedback pulses produced with movement of the carriage 30 along track 22 by a scanning means such as a limit switch or photoelectric cell 48 which scans incremental marks, holes or grid devices 48M along track 22 or disposed on a member positioned adjacent the track, and generates a pulse each time a grid line 48 or pin is so scanned.

The next portion of the command control message is operative to activate code reponsive relay CR-3 to step or rotate switch 68 to the next switching position to gate the following portion of the message to a second predetermining controller PrCMz which is constructed similarly to controller PrCMx. Controller PrCMz is operative to control the servo motor Mz which drives carriage 26 in a vertical direction for propositioning tool T in a vertical direction relative to work disposed in alignment therewith as a result of controlled operation of motor Mz.

The coded relay CR-3 which controls operation of the rotary switch drive element of switch 68 is next energized by a code or tone comprising the next portion of the command message to step the input 66' thereto to an output extending to a third predetermining controller PrCMR which controls operation of fixture rotating servo motor MR for angularly positioning the tool mounted portion of the fixture relative to the work described elsewhere herein. The input 66' is controlled by the stepping of switch 66 through CR-4 and S-3. Servo motor MR may be operative to rotate the entire fixture on its base or overhead mounted carrier or to pivot one or more portions of the fixture and the notation may be representative of a plurality of such motors operative to rotate, project or pivot different portions of the fixture and/or tool.

Figure 4:
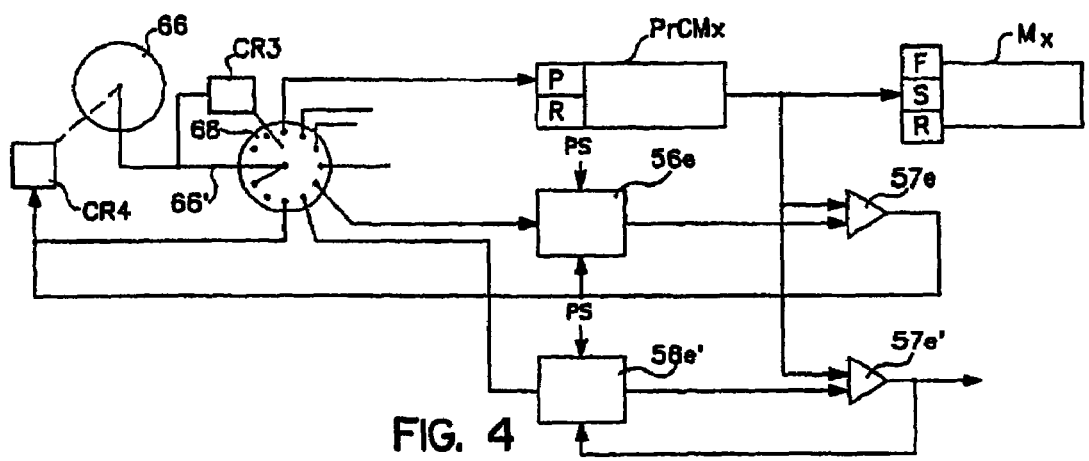
FIG. 4 is a schematic diagram showing further modifications to a system of the type illustrated in FIG. 3.

Further portions of the reproduced digital message are operative to activate the relay CR-3 which effects rotation of rotary switch 68 for gating predetermined portions or units of the message to other controllers for controlling operation of the tool or tools disposed on the fixture prepositioned by motors Mx, Mz, MR, etc. The controllers illustrated in FIG. 4 are presented to be illustrative only and their number as well as mode of operation and devices controlled thereby may be varied according to specific production requirements. These controllers include pulse presettable predetermining controllers PrCMT-1 and PrCMT-2 the function of which will be described and one or more variable control devices MTC. In their simplest form, control devices MTC may comprise multicurcuit timers or the like adapted to gate electrical energy or pulses to the respective of the start and stop controls of the various motors and servos such as Mx, Mz, MR, MT-1 and MT-2. Such gating may be in sequence and of a time duration or time separation such that the tool or tools T-1, T-2, etc. mounted on the fixture will be operated in a predetermined manner during a production, inspection or maintenance function and/or will be moved through a predetermined path after being prepositioned as described.

Assume first that the tool transport means or tool carriage assembly 24 is located with the carriage 30 stopped at a home position as defined by a pin 49 or other stop located on the track 22 which engages the actuating arm of limit switch 49' mounted on carriage 30 causing said switch to activate the stop control S of motor Mx. A start pulse comprising a portion of the reproduced command control message is gated through rotary switch 68 and transmitted on an output 68-1 thereof to the start control F of motor Mx. Thus, assembly 24 is driven along track 22 in the direction of the workpiece or device which is situated adjacent track 22 and is adapted to be operated on by tool T or scanned by an inspection device mounted on carriage assembly 24.

As carriage 30 travels along track 22, photoelectric scanned 48, scans position indicating marks 48M disposed along or adjacent track 22 and generates pulses for uncounting the predetermining counter controller PrCMx which has been preset by a portion of the command control message. Upon uncounting, the controller PrCMx transmits a control pulse to the stop control S of motor Mx and the forward or up-drive control input U of motor Mz to cause the carriage 26 to rise from its lowermost position at the bottom of the track defined by vertical member 25. Uncounting of predetermining controller PrCMz is effected by means of a switch SWMz positioned to become actuated with rotations or fractions of rotations of the output shaft of gear motor Mz and to generate a pulse each time it is so actuated which is transmitted to the uncount input of controller PrCMz.

Upon uncounting, controller PrCMz generates a control pulse which is transmitted to the stop control S of motor Mz and to the start control F of motor MR which rotates the fixture or portion thereof mounting the tool a predetermined degree. Control of motor MR is effected by a limit switch SWMR generating feedback signals as it becomes actuated by means of a cam mounted on the shaft of the output of gear motor MR. Switch SWMR provides feedback, uncounting pulses to the uncount input of predetermining counter controller PrCMR. Upon uncounting, controller PrCMR generates a pulse which is transmitted to the stop control S of motor MR and to the start control F of motor or tool servo MT-1 which is coupled to tool or power operative device T-1.

The output shaft of motor MT-1 is operative to actuate a limit switch SWMT-1 or operative for sensing the rotation thereof, which generates a feedback pulse and transmits same to the counter controller PrCMT-1 which effects uncounting of said controller. Upon attaining its uncount condition, controller PrCMT-1 generates a control pulse and transmits same to the stop control S of motor MT-1. For certain fabrication, inspection or maintenance functions it may be merely required to operate the tool, clamp or inspection device T, for a predetermined time interval or degree of movement thereof which will be substantially a function of the number of rotations of the output drive shaft of the gear motor or servo MR.

In other production or maintenance functions employing apparatus of the machine or station 16-1 which is more complex in operation, it may be desired to operate one or more additional servos, tools or inspection devices after tool T-1 has been operated. In FIG. 4 control means are provided (1) for either reversing operation of each of the servos MR, Mz and Mx to cause the respective assemblies moved by each to return to a home position, (2) for activating a further tool or tools T-1 or (3) for activating one or more predetermining controllers MTC to control either or both the tool or transport drive motors in a predetermined cycle whereby the tool or tools move through a predetermined path and operate in a predetermined manner at the location attained by means of the positional control effected by the first portion of the command control message.

Portions of the command control message may be operative to effect the selective operation of certain of the servo motors or power operated devices to the exclusion of others by activating certain control elements to the exclusion of others during a particular control cycle. For example, a single presetting pulse may be gated through switch 68 (whereafter said switch steps to its next position) to any of the predetermined controllers PrCMx, PrCMz, PrCMR, permitting operation of the respective servo controlled thereby for only one rotation or fraction of rotation of its shaft so as to result in little or substantially no movement of the apparatus driven thereby.

Turning now to the operation of predetermining controller PrCMT-1, the output of said controller on which the uncount control pulse is gated, is connected to inputs to a number of switching control elements or circuits 57a, 57b and 57c. These control circuits are logical AND switching circuits which are each operative to generate a pulse on its respective output when its two inputs are simultaneously energized. Accordingly, the other inputs to the AND control devices 57a, 57b and 57c are connected to respective further control elements or circuits 56a, 56b and 56c any one of which may be energized by a signal portion of the command control message gated thereto from a respective output of the rotary switch 68.

In their simplest form, the control devices 56 comprise a bi-stable switch or flip-flop which is operative when energized by a signal passed to its input from switch 68, to gate a power supply (not shown) through control device 56 to energize the input to the AND switching element 57 connected thereto until the predetermining controller having its output connected to the other input of said AND switching element, uncounts. In other words, if it is desired to reverse the operation of motor MR after motor MT-1 has finished its cyclic function, control element 56a will have been activated by a signal portion of the command control message gated through switch 68 thereto to the exclusion of the activation of control devices 56b and 56c as the result of the switching of 68 past the terminals of the switch connected to the inputs to 56b and 56c without gating signals through said switch thereto. If 56a is so activated, then when controller PrCMT-1 uncounts, the output thereof will only activate AND switching element 57a resulting in the generation of a control signal on the output of element 57a which is passed to the reverse control R of motor MR and the stop control S of motor MT-1. A time delay relay (not shown) may be provided in the circus between element 57a and control R of servo MR to permit motor MT-1 to stop before the operation of MR, if necessary.

Thus, the output of AND switching circuit 57a is utilized to pulse the stop control S of servo MT-1 to terminate the operation of the tool T-1 powered or controlled thereby and is also utilized to drive motor MR in reverse to its home position which, when obtained, is operative to activate a limit switch 59 engaging a portion of the fixture driven by servo device MR. Activation of switch 59 is operative to gate a control pulse to the stop control S of motor MR and to the down drive control D of servo Mz. Activation of control S of the servo MR is operative to stop said servo with the fixture driven thereby at its "home" position while activation of D of servo Mz is operative to drive carriage 26 to its lowermost, "home" position on the track associated with the vertical column assembly 25.

Upon attainment of said lowermost position by carriage 26, a further control limit switch SWZo mounted on either carriage 26 or vertical assembly 25 becomes actuated and gates a power supply or pulse to the stop control S of motor Mz and the reverse drive control R of gear motor Mx resulting in movement of the assembly 20 to the "home" position defined by the track mounted pin 49 at which position limit switch 49' becomes activated and pulses the stop control S of motor Mx resulting in stoppage of the assembly at said home position.

To include the predetermined operation of a further tool or power operated device T-2 in the hereinabove described cycle or to perform further predetermined operations including movement of tool or device T-1, the command control message will have been so composed as to have pulsed or activated certain of the other control elements 56b, 56c, 56d, etc. For example, if the command control message is operative to pulse control switch 56b gating a power supply to the AND switching circuit 57b to the exclusion of circuit 57a, then, when controller PrCMT-1 uncounts, a signal will be generated on the output of AND circuit 57b which is passed to the forward drive control F of a reversible gear motor MT-2 thereby causing motor MT-2 to drive tool or device T-2 in a first direction. The output of AND circuit 57b is also passed to a resetting or deactivating input of control switch

56*b* so as to deactivate same once its function has been fulfilled as are the outputs of each of the other illustrated AND switching circuits.

In other words, when control switches 56 are so deactivated, the power supply gated to their respective AND switching elements are no longer connected thereto. A feedback signal generating switch SWMT-2 is coupled to operate with rotation of the output shaft of servo MT-2 by means of a cam or other switch energizing device mounted on said shaft and provides feedback pulses to the predetermining counter controller PrCMT-2. Upon uncounting, PrCMT-2 generates a pulse on its output which activates the stop control S of motor MT-2 and is also utilized to energize either the down drive control D of motor Mz if the tool operating portion of the cycle is to end at this point. However, if it is desired to effect further movement and/or operation of one or more of the power operated tools or devices, the output of PrCMT-2 may be utilized to activate a preset controller MTC such as a multi-circuit timer having a plurality of output circuits which extend to those of the illustrated motor start, stop and reverse controls which are desired to become activated in sequence and at predetermined time delays after the initial energization of controller MTC to perform the desired operation of the described apparatus.

While the multi-circuit controller MTC may be preset or predetermined in its function by a portion of the command control message, it may also be manually preset to perform a predetermined production operation and may comprise but one of a plurality of such cycle controllers which are operative only when a control switch 56*d* therefor is activated by a portion of the command control message and energizes an input of an AND switching circuit 57*d* having its other input extending from the output of controller PrCMT-2.

In order to prevent activation of the down drive control D of servo Mz while the cycle controller MTC is activated, one of the outputs 71 of controller MTC is connected to the switching input of a normally closed switch 70 in the circuit between PrCMT-2 and the down drive control D of motor Mz to effect the activation of switch 70 and the opening of said circuit so as not to permit the control pulse generated by PrCMT-2 to energize D of motor Mz. A time delay relay 69 located between the output of PrCMT-2 and D of servo Mz delays the pulse a sufficient interval so that it will appear at the input to switch 70 after said switch has opened. If switch 70 remains closed in the event that controller MTC is not activated, said pulse will be passed directly to D of servo Mz to effect the termination of the work cycle whereafter the carriage 26 is driven to the lower (or upper) home position resulting in the activation of control limit switch SWZo which stops carriage 26 at said position and activates the reverse drive control R of motor Mx resulting in the return of the tool carriage assembly 24 to the home position defined by pin 49 on track 22.

In the control functions described employing the reproduction of recorded command control messages to preset or energize controls of various predetermining controllers, operation of the multiple channel, endless track magnetic recorder recording medium was assumed to be continuous so as to permit the recording of new control messages while messages already recorded thereon are being reproduced. If a complete command control message is recorded on a single channel of the multi-channel recorder and is utilized as described to preset various of the predetermining controllers, the correct portions of said message may be gated to the correct predetermining controller inputs P by the provision of a normally open switch 68S in line 66' which will not pass any portion of the command message destined for the controllers situated beyond switch 68 until the appearance of the leading portion of the message one line 66' which contains a tone or code operative to energize relay CR3. Switch 68S is operatively coupled to CR3 and is closed thereby when the latter is energized and remains closed for a sufficient time interval to pass the longest messages to be gated to the various controllers situated beyond switch 68. In other words, switch 68S is either slow to open after closing or may be operative to close as a bi-stable switch by a portion of the control message gated therethrough. Switch control CR3 as well as the others are assumed to contain, in addition to activating means responsive to respective codes or tones, means for activating the various rotary switches and gates illustrated in FIG. 3 upon receipt thereby of the proper tone or code.

In FIG. 3, a coded relay CD is operative to start drum drive motor MD which is preferably a constant speed motor. Relay CD may be activated by either a code or tone portion of the command control message or one generated by an operator at the computer station 50.

While motor MD preferably operates at constant speed to permit the recording of certain messages while others are being reproduced and used for control purposes, it may also comprise a stepping motor operative in response to a coded or tone responsive relay energized by portions of a command control message or signals generated on the outputs of predetermining counter controllers PrCMx, PrCMz, PrCMR, etc. and MTC. Thus, portions of a command control message are reproduced sequentially only after the previously reproduced portions have been operative to preset or energize the previously controlled mechanism.

Notation MR in FIG. 3 may also be representative of any motor adapted to effect operation of the tool transport in a mode other than those modes controlled by motors Mx and Mz. It may comprise a joint rotating motor or one used to project and retract the tool. It may also define servo means for controlling other fixture or tool variables.

In FIG. 3, each of the predetermining counter controllers PrCMx, PrCMz, PrCMR, PrCMT, and PrCMT-2 has an input R, which, when pulsed, is operative to reset the counter to a null condition.

A code or tone responsive relay CR-6 has its output connected to all of the resetting inputs R of the PrC controllers and MT-2 and its input connected to the input side of the switch of relay CR-1. If it is desired to reset the controllers for any reason prior to their operation, such function may be effected by transmission of the proper codes or tones from station 50 to the receiver 62 for energizing relays CR-1 and CR6.

In FIG. 3, the fixture and carriage locking solenoids 32 and 30*s* which have been described as to function, are advanced to engage and retain their assemblies against the respective surfaces by the uncount pulse produced on the output of PrCMz and are each retracted by the control pulses generated respectively on the outputs of switches 70 and SWZo to disengage their retain members at the end of a work cycle.

The command control signal recording and reproduction apparatus hereinabove described may be modified to include operation where certain tracks of the recording drum 65 are adapted to receive and record command control messages transmitted from computer 54 while other tracks contain recordings already provided thereon by locally recording same or other means and operative to effect predetermined movements and operations of the tool or device associated with the machine being controlled.

In the control function where recordings are transmitted from station 50 and recorded on selected or sequentially available tracks of the recorder 64, automatic signal erasure means may be employed to erase each command control message after it has been reproduced therefrom or during the recording of a new message on the same track. To retain certain signal recordings such as those which may be immediately or shortly thereafter reused for repeating a particular controlled action, erasure control may be effected by use of a tone responsive or coded relay gating a power supply to an erasure means such as a head riding on the track just reproduced from, said coded relay being connected to receive the control message and respond to that tone or coded portion thereof to which it is responsive.

A rotary stepping switch 67 in FIG. 3 is operative to connect a power supply PS with an erase head EH which is riding against the track just reproduced from, when a coded relay CR5 is activated by a portion of the message reproduced therefrom to effect the last mode of control. The activation of switch 49' signifying the end of a cycle controlled by a particular command message may also be operative to result in erasure of the channel from which said message was reproduced by connecting said switch 49' to activate CR5 or the solenoid controlled thereby.

In another form of the invention, the described digital or pulse train recordings which are reproduced as part or all of the command control messages from magnetic drum 65 may be replaced by a plurality of analog type signals which are operative upon being reproduced from the recording member to directly control the movement of one or more of the described fixture or tool motors. The analog signals may be transmitted from control console 50 or prerecorded on selected channels of drum 65 and reproduced when needed as the result of the action of one or more signals transmitted from console 50 and operative to effect the selective and sequential reproduction of said analog signals to define a particular control cycle.

In other words, apparatus of the type described may be operative by controlling one or more servo motors by signals recorded on selected and predetermined of the recording channels of the drum 65 which are selectively reproducible therefrom under the control of signals transmitted to the receiving means 62 of the selected station 16 from the computer or other device 54 or the manual signal generating means 51. Assuming that there are n number of predetermined operations which the machine at station 16-1 may perform or be required to perform over a given time interval or to cover all possible production, maintenance and inspection functions, then a similar number of command control messages or analog signals would be recorded on known locations of the recorder such as on known tracks of the drum 65 and each would be selectively reproducible therefrom by transmitting the desired signal or signals to the receiver 62-1 to effect, as described, the stepping of switch 66 to connect its output 66' with that pickup head PU which is operatively coupled to reproduce from the channel or track of the drum 65 having the desired command control message recorded thereon.

For certain fabricating, inspection or maintenance functions utilizing the apparatus hereinabove described it may be desired to perform a plurality of prepositioning movements of the tool or power operated device in the vicinity of the particular working location at which it was initially positioned by movement of the carriage 30 along guide or track 22 and carriage or fixture 26 vertically relative to track 25.

For example, it may be desired to step the tool, once located at a particular spacial location in a particular direction or directions to perform a plurality of operations relative to a workpiece located thereat. The functions of drilling a plurality of holes in a line or in any predetermined array, applying a plurality of fasteners or assembling components with the workpiece in spaced-apart relationship, stepping a power operated device such as a welding tool, inspection tool, or the like may be required whereby return of the tool transport assembly 24 to said home position each time the tool operates would result in the waste of a substantial amount of time. Accordingly, means are provided in FIG. 4 for modifying the control apparatus of FIG. 3 to permit any of the described tool positioning and/or operating servo motors to operate a plurality of times during a single cycle to perform predetermined operations on a workpiece in the realm of the tool or tools positioned by said transport means.

While means are provided in FIG. 4 for automatically controlling the predetermining controller PrCMx in a manner to be described, a plurality of said controllers including others thereof as described may be similarly controlled in sequence in a predetermined cycle as defined by the composition of the command control message passed through switches 66 and 68. The pulse presettable predetermining counter PrCMx is preset by a portion of a first of the command control messages reproduced from a first channel or track of recording member 65.

Feedback signals generated by motor Mx uncount PrCMx and result in a first control signal being generated on the output of PrCMx upon attaining its uncount condition. Said signal is transmitted to the stop control S of servo Mx and to an AND switching circuit 57e. The other input to 57e is connected to the output of bi-stable switch 56e having an input which is one of the outputs of rotary control switch 68. The controller switch 56e preferably comprises a bi-stable switch operative when energized by a pulse portion of the command control message passed through 68 thereto, to gate a power supply PS or continuous signal to an input of AND switching curcuit 57e until an output control signal appears on the latter.

Thus, if the command control message is so constructed as to activate 56e, uncounting of PrCMx will result in a signal generated on the output of the AND switching circuit 57e which is passed to the tone or coded relay CR-4 controlling the position of the switching element rotary stepping switch 66. The command control message recorded on the next channel of recording drum 65 which is coupled to output line 66' or switch 66 is passed therethrough and is operative to step switch 68 by activating coded relay CR-3 the correct number of times prior to the passage of a pulse code or train to PrCMx again and a signal to the start control F of servo Mx the reverse control thereof for repositioning carriage 30 and the tool thereof in a horizontal direction. Upon uncounting, PrCMx may be operative to perform any of the control functions hereinabove described which may include operation of one or more of the power operated tools or devices.

In a similar manner, any of the other predetermining controllers PrCMz, PrCMR, PrCMT-1, PrCMT-2, etc. may be controlled in a predetermined manner to step the tool in any direction, cause it to travel a predetermined path, and/or predetermine its intermittent or continuous operation.

A second AND switching control circuit 57e' and flip-flop controller 56e' therefor are shown operatively connected to the output of PrCMx and switch 68 respectively for controlling the operation of any of the other servo motors described for positioning and/or operating the tools in the manner described. For example, assuming that the command control message does not contain a command portion to be passed through switch 68 to the input of 56e but does contain a portion which will be passed to 56e' when the arm of switch 68 is operatively coupled to the line or terminal thereof which is connected to 56e'. As a result, that servo or power operated device which is connected to the output or circuit 57e' will become activated upon the uncount of PrCMx and may be controlled as described by generating feedback pulses with its operation which are fed to a respective predetermined controller.

Figure 5:
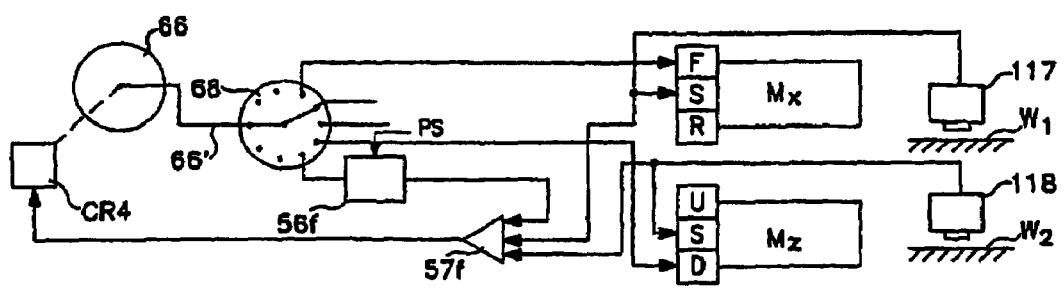
FIG. 5 is a schematic diagram showing further modifications to the system shown in FIG. 3.

In FIG. 2', control elements 117 and 118 in the form of limit switches or surface sensing devices were shown mounted on portions of the tool head or mount and were defined as operative to sense the surface of a workpiece towards which the tool is transported and to effect further control of the movement of the tool upon becoming activated. A modification to the control system of FIG. 3 is illustrated in FIG. 5 in which limit switches 117 and 118 are illustrated as forming part of the control circuitry. It is, of course, assumed that in FIGS. 4 and 5, the other elements of the circuit not illustrated therein are provided in FIG. 3 and are present and are modified accordingly.

Limit switch 117 is assumed to be operative to sense vertically disposed surfaces of the workpiece represented by the notation W1 and limit switch 118 is operative to sense horizontally disposed surfaces of the workpiece located below the tool which, in this modification, is movable towards the workpiece from above. Either or both switches 117 and 118 may be operative to preposition the tool relative to the workpiece. Assume that the tool is first being moved in a horizontal direction by operation of motor Mx and that limit switch 117 is so positioned that its actuator arm or sensing element will first engage a vertical or substantially vertical surface of a workpiece or other member adapted to be operated on or scanned by the tool. The motor Mx is first started by a portion of the command control message passed through switch 68 while the predetermining controller PrCMx has remained deactivated as the result of failure to receive presetting signals as a portion of the command control message. It is, of course, assumed that the tool or tool arm having switch 117 mounted thereon has previously been positioned at a desired vertical location by the predetermined operation and control of motor Mz. Upon approaching said vertical surface, the switch 117 becomes activated as the result of engagement of its actuator arm against the surface W1 of the workpiece or other element mounted in its path of travel. Closure or activation of switch 117 results in the generation thereby of a pulse signal and its transmission to the stop control S of motor Mx and one input of an AND switching circuit 57f. The other input to 57f is from a flip-flop controller 56f having a switching input connected to rotary stepping switch 68 and operative to become activated upon transmission thereto of a portion of the command control message.

Thus, if the command control message is operative to activate 56f, upon the activation of switch 117, motor Mx will stop and a pulse generated on the output of 57f will be transmitted to the relay CR-4 for stepping switch 66. As a result, the next command control message recorded on the drum 65 is reproduced therefrom and passed through switch 66 and gates portions of itself to those predetermining controllers and/or servo motor controls defined for cyclic operation in said next reproduced command control message. Similarly, if switch 118 is activated when it is driven against horizontal surface W2 by movement of the transport apparatus, it will generate a pulse on the output of AND switching circuit 57f provided that 56f has been energized by a portion of the command control message and will result in the generation of a new command control message for further controlling selected of the servo motors described.

Other features of the invention are noted as follows.

As stated, the tool transport fixture may be provided in a variety of machine configurations and may be floor, overhead, wall or machine mounted or movable on guide means secured to a plurality of such locations. Various configurations for such tools and fixtures are illustrated in my said abandoned application and vary from a single column subtending from an overhead track travelling carriage and having a tool such as a spray head or scanner mounted on an arm supported by a vertically movable fixture to one or more tools movable at the end of an arm or assembly which is movable in a plurality of ways by pivoting, rotating, projecting, retracting and otherwise moving portions of the fixture with respect to each other and the carrier or mount supporting the entire assembly.

Each assembly or movable portion of the entire tool transport fixture may be power operated to rotate and/or translate by means of one or more servo motors coupled thereto through gears or other drive means and mounted on said assembly or the adjacent assembly. Sequential control of the various servo motors to effect eventual prepositioning of the tool or tools as described or by modification to the control apparatus hereinabove provided. Such modifications may include the following which are intended to comprise part of this invention.

Signals reproduced from an erasable recording medium such as the magnetic recording drum 65 may be sequentially gated directly to the controls of one or more of the illustrated and described servo motors used to position the fixture, tool and/or to operate said tool in a predetermined and programmed manner. Said signals may be utilized per se or generated as part of the described command control message to effect at least part of the control functions described by direct control of the servo coupled to the reproduction transducer reading drum 65. In other words, predetermining controllers PrC and MTC may be eliminated completely during a control cycle where the precision required in the operations of the apparatus is such that feedback signals are not required and the operations of the servo motors employed may be controlled by the duration or composition of the signal or signals reproduced from the recordings temporarily provided on number 65 by transmission thereto as described.

A combination of fixture positional control effected by one or more predetermining controllers as described and direct control of the tool operation itself by one or more signals reproduced directly from the drum 65 and transmitted directly to the motor or motors to be controlled in operating the tool, may be utilized for certain operations. This may be variably effected by operatively connecting those servo controls which are to be controlled by signals reproduced directed from the drum 65, to selected of the outputs of switch 68 which may be coupled to selected channels of drum 65 by signals reproduced from recordings on other channels. In other words, a command control message for a particular cycle is recorded on several channels and the latter portions of the message recorded on one channel are used to effect switching of output 66' of switch 66 to the next channel by energizing relay CR4 which activates solenoid S3 to switch 66 to the next position. Accordingly, line 66' is shown connected to the input circuit 68' through rotary switch 68 to relay CR4 so that if the proper tone or code appears on the output of switch 66 as reproduced from one channel, CR4 will become activated and will switch 66 to the next channel thereof without the need for first stepping switch 68.

Figure 6:
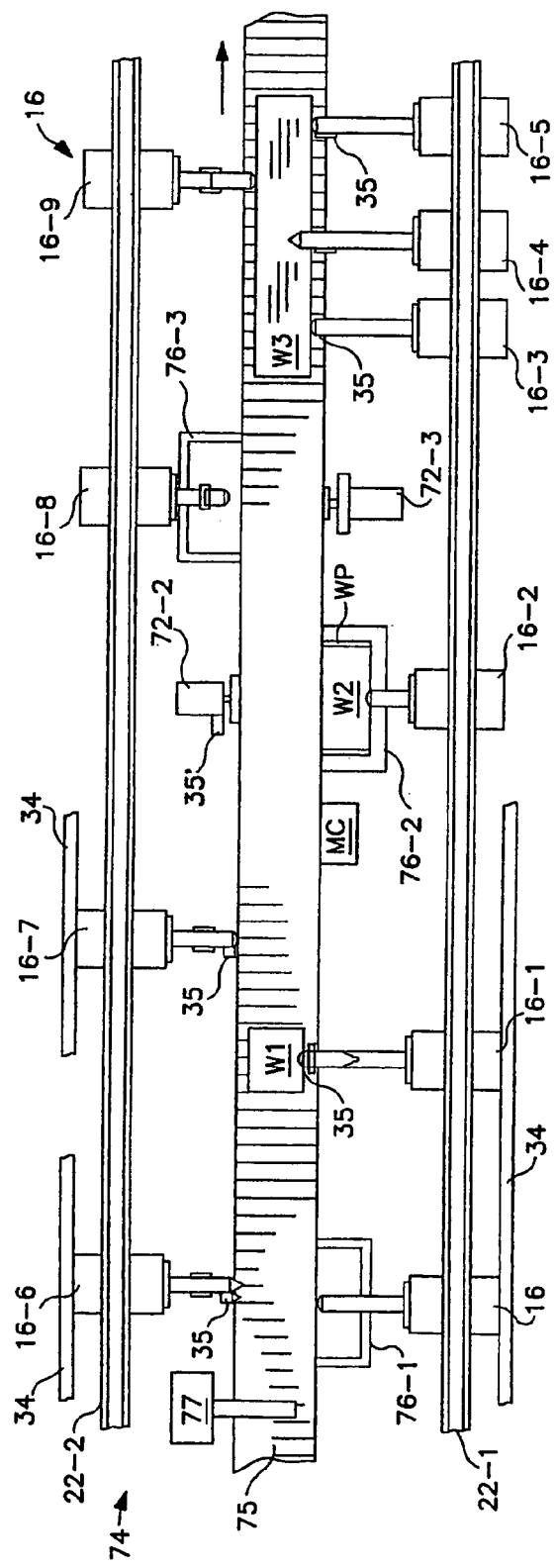
FIG. 6 is a plan view of an automatic production line embodying features of the instant invention.

FIG. 6 shows details of a portion of an automatic production system 74 which includes a plurality of remotely controlled machines of the type described or modifications thereof and conveying means for work in process disposed adjacent to the line of machines. A production line is defined in FIG. 6 which includes a centrally disposed power operated conveyor 75 such as a belt conveyor driven by motor MC, flight conveyor or chain conveyor operative to carry individual units of work, three of which are illustrated and defined by notations W-1, W-2 and W-3, past a plurality of production machines 16 defined by notations 16-1 to 16-9.

FIG. 6 discloses means for guiding a plurality of production machines adjacent to both sides of the conveyor 75.

Such guide means includes overhead and/or floor mounted guideways or tracks of the type heretofore described and defined by notations 22-1 and 22-2. Movable along track 22-1 are a plurality of self-propelled machine assemblies denoted 16-1 to 16-5 while two such self-propelled production machines 16-6 and 16-9 are illustrated as movable along the track or guideway 22-2 for performing on work from the other side of the conveyor 75. A complete production line may include a substantial number of additional self-propelled machine tools, inspection machines and, in certain instances, automatic manipulators for handling, aligning, and transferring. If necessary, prepositioning work in process is derived from the conveyor 75 or auxiliary conveyors adjacent thereto for performing one or more operations thereon in cooperation with machine tools, inspection devices and other equipment mounted for travel along the track 22-1 and 22-2 or auxiliary machinery positioned adjacent thereto.

The apparatus illustrated in FIG. 6 may be operated in a number of modes, several of which are illustrated in the drawing. A first work piece W-1 is located on the conveyor 75, and a first machine 16-1, which is self-powered to move along the track 22-1, is disposed in alignment with work W-1. In a first mode, the machine or tool 16-1 may be driven along the track 22-1 until it senses either end of the work W-1 or a pallet or container supporting said work on the conveyor. Detection may be effected by use of a scanning device such as the photoelectric detector 35 of FIG. 2, the limit switch means 117 of FIG. 2' or suitable detection means mounted on the tool assembly or tool head as illustrated in FIGS. 2 and 2'. The detection signal is transmitted as a feedback signal to initiate operation of the automatic controller or computer MTC shown in FIG. 3' as controlling the operation of the tool 16-1 by predeterminately controlling the motors operating said tool and the tool then performs preprogrammed operations on the work piece W-1. In one form of this operation, the work may be moving at constant speed on conveyor 75 while the signals controlling the operation of the tool 16-1 are so composed as to move the tool along with the moving work and cause it to exercise said preprogrammed operations while the tool is moving to account for the movement of the work. In a second mode of operation, the detection signal is also operative to stop the conveyor 75 or the remotely located command signal generator or controller is programmed, not only to effect predetermined operation of the tool but also stoppage of the conveyor 75 so that the work W-1 may be operated on by the tool while said work is stationary on the conveyor.

In the third mode of operation, a work piece W-2, which is self-supported or supported by a carrier or pallet WP on the conveyor 75, is transmitted to a temporary work station 76-2 by means of a transfer device 72-2 located adjacent the work station and operative to push or otherwise carry the work into the temporary work station platform. The automatically controlled machine tool 16-2 is either prepositioned at the work station 76-2 as a result of its previous movement thereto or is driven to the work station under the control of signals generated by a computer or controlled command message generator of the type illustrated in FIG. 3. Alignment of the tool 16-2 with respect to the work W-2 may be effected by scanning alternate switch means detecting a marker or other suitable locating means at the work station 76-2 or by detecting the work itself or its supporting pallet. When the preprogrammed operations are completed by the machine 16-2 on the work W-2, said machine or another machine such as an automatic manipulator, which is drivable along either track 22-1 or track 22-2, is operated by the same computer and is operative to lift or otherwise transfer the work to the conveyor 75 for movement to the next station.

A fourth mode of operation of the apparatus of FIG. 6 involves the automatic control of a plurality of machines or tools, four of which are illustrated and denoted by notations 16-3, 16-4, 16-5 and 16-9 and all of which are remotely controlled, as described, to perform different operations on the same work piece W-3. The work piece W-3 may comprise a large unit of work such as a casting requiring multiple operations thereon which may be simultaneously performed or may comprise an assembly of elements forming a product or a product subassembly. The tools 16-3 to 16-6 may comprise one or more power-operated devices for performing such operations as drilling, tapping, assembling screws or other fasteners, welding, spraying, assembling parts or sub-assemblies with the work W-3, inspecting, plating, spraying, deburring, etc. Said tools may perform such preprogrammed operations from either or both sides of the conveyor 75, as certain of the tools are operative to move along and be positioned with respect to the track 22-2, while others operate on track 22-1 from the other side of the work W-3. Here again, the multiple tools may be programmed to operate on the work W-3 while said work is stationary on the conveyor 75 or adjacent thereto or while said work is in motion with the tools performing their operations while accounting for the work movement by relatively moving along the guide ways 22-1 and 22-2 with the work.

The work stations 76 may contain auxiliary means for manipulating the work with respect to the tool to present different portions of the work to the tool head or automatically controlled manipulators forming some of the tools 16 may be operative along the track ways 22-1 and 22-2 to seize and vary the attitude of the work or hold same during the operation of one or more tools located on the same or opposite track way to perform preprogrammed operations on the work.

If the conveyor 75 is controlled by a computer which also controls the operations of the various tools and the loading of units of work onto said conveyor, then the location of any particular unit of work on the conveyor will be a known factor during any interval in a work cycle and, accordingly, the proper distribution of command control messages to the different machine tools may be effected by properly timing the entire operation and operating the remote computer or message generator by sequentially reproducing, generating and transmitting the desired command control messages at predetermined time intervals to control the respective machine tools as described.

Figure 7:
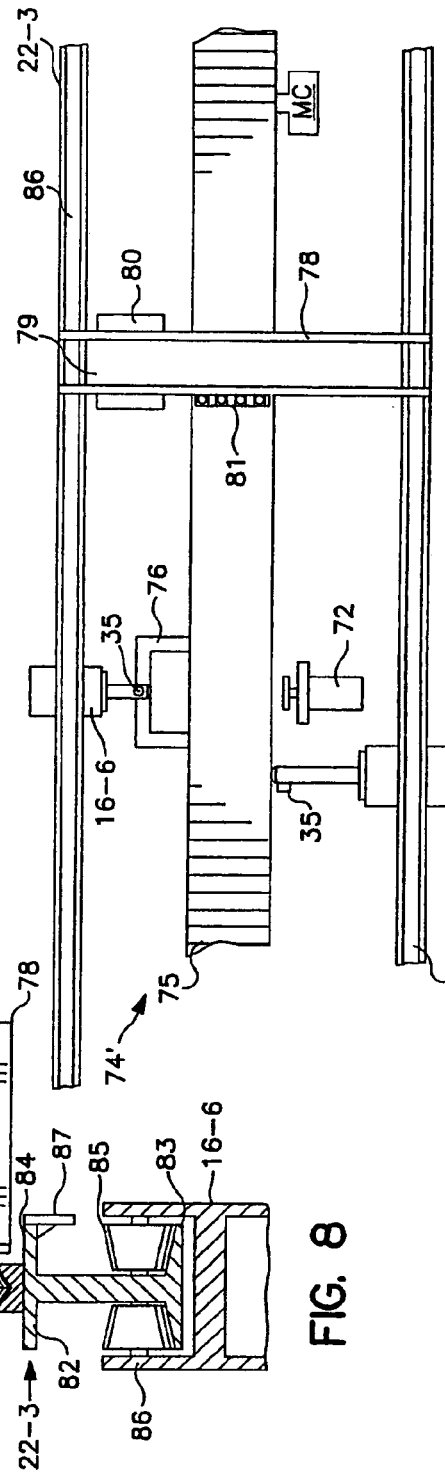
FIG. 7 is a plan view of a portion of a modified automatic production line embodying features of the invention.

FIG. 7 illustrates a modified form of automatic production system 74 embodying, in addition to the features found in FIG. 6, the provision of a bridge crane assembly 78, which is supported for movement above and parallel to the conveyor 75 and contains one or more carriages, one of which is shown, at numeral 80, adapted with tooling and/or work handling means for performing operations on work carried by said conveyor 75. The crane apparatus 78 may be used to perform a number of functions including, in addition to supporting and positioning power-operated tooling such as power-operated drills, riveters, inspection devices, and other tooling below the carriage 80 thereof to locate said tooling above the work for operating on the top wall and upper portion of the work, such other functions as picking up the work and transferring it to a fixture or platform adjacent the conveyor 75 or to another conveyor, turning said work around or assembling it with other work, feeding parts or subassemblies to the work or holding and repositioning the work with respect to other tooling such as the track travelling tools 16-1 and 16-6 illustrated. The crane and tooling or handling manipulator of assembly 78 may be operated in an automatic mode under the control of the master controller or computer controlling operation of the other tooling and/or may be controlled by preprogrammed means located on the bridge crane when a detection means 81 located on the bridge 79 of the crane 78 or on the structure depending downwardly from the carriage 80 scans and detects work travelling along the conveyor 75.

In a particular form of the apparatus shown in FIG. 7, it is noted that one or more bridge cranes such as 78 for supporting tooling and/or manipulation means for performing on work along the production line and a plurality of the described track travelling tools 16 of the type described may all be operative to travel and be supported by the same bi-rail trackways denoted 22-3 and 22-4 in FIG. 7, and the cranes 78 may be so mounted as to permit said cranes to bypass the tools 16 to operate along any selected length of the production line.

Figure 8:
FIG. 8 is an end view in partial cross section of a portion of the apparatus shown in FIG. 7.

FIG. 8 illustrates details of a portion of the overhead conveying apparatus of FIG. 7, including one of the trackways 22-3, production tool 16-6 suspended therefrom and bridge crane 78 movable therealong. The trackway 22-3 comprises an overhead supported I-beam 82, the lower flange 83 of which is adapted to support and guide the wheels 85 of the carriage 86 of the tool 16-6, which tool may embody the features shown in FIGS. 2, 2' and 2" or modifications thereof. Secured to the upper flange 84 of the I-beam is a rail 86 having a V-shaped channel in its upper surface. Riding in the V-shaped channel in 86 and guided thereby are the wheels 81 of the bridge crane 78. The rail 86 may also comprise an integral portion of the I-beam or may be replaced by a groove or V-shaped channel in the upper flange thereof. A similar rail or channel formation in the other trackway 22-4 may serve to support and guide the wheels supported by the other end of the bridge crane 78 so that a single pair of I-beams may define the trackways 22-3 and 22-4 and support both the monorail travelling tools 16 and one or more bi-rail devices 78 or bridge cranes defining the automatic production system or line 74'. It is noted that the bridge crane 78, if suspended as in FIG. 8, and if the carriage or tool assembly 80 suspended therefrom is centered on the cross-track 79 thereof, may travel past the tools 16 suspended on either or both trackways to transport or perform on work at any location along the line without colliding with any of the tools or machines provided adjacent the conveyor. Accordingly, the bridge crane 78 may serve to transport work or assemblies from machine to machine or to select machines for effecting operations thereon. In certain instances a plurality of cranes 78 may be used to supplement or replace the conveyor 75 and may travel the entire length of the line or transfer finished work from the line.

The apparatus hereinabove described is subject to a number of variations and improvements noted as follows:

I. One or more branch conveyors may extend from the main conveyor for the work for either temporarily holding work in process until a machine tool or tools are available to perform preprogrammed operations thereon or for conveying work past a plurality of other machines disposed adjacent said branch conveyors The branch conveyors may comprise flight conveyors similar to the main conveyor and onto which work is selectively shuttled by means of ram type transfer devices as in the same way work transfer units 72, 72-2, 72-3 shuttle workpieces onto respective work platforms 76, 76-2 and 76-3 as is evident in FIGS. 6 and 7. Branch conveyors may also comprise overhead power or power and free conveying means or monorail travelling cranes operative to pick up and carry units of work from the main conveyor or from branch gravity chutes or platforms extending therefrom. The units of work may comprise work per se or work mounted on pallets or carriers. Command signals operative to effect transfer of work or pallets to said branch conveyors may be generated by a computer which keeps track of each pallet or work unit disposed on the main conveyor by receiving signals indicative of the main conveyor's speed and computing each pallet's location or by codes provided on each pallet at each branch conveyor location which are effective in operating selected of the transfer machines.

II. A single master controller or computer may be operative to control the shuttling of each work holding pallet WP not only to each machine located adjacent the main conveyor but also the operation of each machine after it has controlled the movement of the pallet to the machine and its locking securement at its respective work platform 76, 76-1, 76-2 and 76-3 as shown in FIGS. 6 and 7.

III. A bridge crane 78 of the type described travelling the monorails 22-3 and 22-4 at the sides of the main conveyor 75 may contain, in addition to or in place of, one or more machine tool heads for working on work or work assemblies 80 disposed therebeneath either on the main conveyor or on a platform or branch conveyor adjacent thereto, may have a work seizing means such as manipulator jaws for picking up and manipulating work or components of work or may have work assembly means extending therefrom to permit said crane to pick up work and/or machines or machine components disposed therebeneath and transfer or preposition same with respect to the conveyor, machine tool or work disposed in the vicinity thereof. The operation of the bridge crane 78, its tool or tools and/or its manipulator depending therefrom may be controlled by signals generated in reading codes on a work holding pallet which codes are formulated to predeterminedly control said manipulator or tool or by signals generated by the described master controller or computer controlling either the entire production system, a particular tool or group of tools or the conveyor and crane or cranes disposed adjacent thereto.

IV. The described monorails disposed at both sides of the main conveyor 75 of FIGS. 6–8, may support, in addition to the described machine tools, one or more carriages mounting one or more article manipulators of the types defined in my U.S. Pat. Nos. 3,272,347 and 3,259,958 which are automatically controlled by computer and/or by signals generated in reading codes provided on work holding fixtures or pallets to perform such operations as manipulating and handling the pallets, units of work held by the pallets, work components to assembly same with the fork held by the pallets, inspection devices, machine tools and tool components such as cutters to be assembled to the tool or tool holder or worn or broken cutters to be removed therefrom. In the latter function, signals generated by the tool controller or master controller or computer may operate the manipulator to seize and release cutting tools or other devices either from the tool itself, a tool changer or a carrier therefor located on the conveyor 75 or a supply rack adjacent said conveyor.

V. Communication between a master controller or computer and the machine tools 16 provided adjacent the conveyor 75 as well as the described cranes and manipulators may be effected by radio or short wave, micro-wave communication means or by means of modulated light waves such as generated by lasers located at the computer and machine tools. Photoelectric detection receiving means may be disposed at each machine tool to receive modulated light beams such as pulsed beams modulated with commands which are transduced to pulse trains or frequency code signals and stored in relay storage at the tools for controlling the execution of programmed operations on the work disposed adjacent each tool. Two way communication by similar transmitting means at each tool to the master controller or computer may be effected to provide feedback information of the operation of the tools to the computer which may adaptively or otherwise adjust its output to control the tools accordingly.

I claim:

1. The process of producing engineering components from workpieces by the removal of material therefrom by means of a plurality of data-controlled machine tools, each of which has automatic means for locating and securing thereon a common workpiece holder, said machine tools being complementary to each other in relation to the machining operations to be carried out on the workpieces; said process comprising:
   securing each workpiece to a workpiece holder in a predetermined position and attitude with respect to the workpiece holder,
   delivering each workpiece holder to storage means and storing each workpiece holder so that each workpiece is selectively accessible;
   selecting each workpiece holder from said storage means;
   presenting each of said selected workpiece holders to a selection of said machine tools in predetermined sequence;
   automatically and sequentially locating and securing each of said selected workpiece holders at a predetermined location and attitude in each of said selected machine tools and subsequently performing programmed machining operations on said workpiece in each of said selected machine tools while said workpiece holder is so located and secured therein.

2. The process of producing a plurality of different engineering components from workpieces of different forms by the removal of material therefrom by means of a plurality of data controlled machine tools, each of which has automatic means for locating and securing thereon a common workpiece holder, said machine fools being complementary to each other in relation to the machining operations to be carried out on said workpieces; said process comprising:
   securing each workpiece to a workpiece holder in a predetermined position and attitude with respect to the workpiece holder,
   delivering each workpiece holder to storage means and storing each workpiece holder so that each workpiece is selectively accessible,
   selecting each workpiece holder from said storage means,
   presenting each of said selected workpiece holders to selected of said machine tools in predetermined sequence, the sequence for each form of workpiece being different,
   automatically and sequentially locating and securing each of said selected workpiece holders at a predetermined location and attitude in each of said selected machine tools and
   subsequently performing programmed machining operations on each of said workpieces in each of said selected machine tools while the respective holder is so located and secured therein.

3. The process of claim 2 wherein the act of storing each workpiece holder so that each workpiece is selectively accessible comprises storing each workpiece holder so that each workpiece is selectively accessible independently of other workpieces.

4. The process of producing a plurality of different engineering components from workpieces of different forms by performance of operations thereon by means of a plurality of data-controlled machine tools each of which has automatic means for locating and securing thereon a common workpiece holder, storage means having a plurality of locations for workpieces stored thereon so that each workpiece is selectively accessible, transport means, and programmable control means, said machine tools being complementary to each other in relation to the operations to be carried out on said workpieces; said process comprising:
   securing each workpiece to a workpiece holder in a predetermined position and attitude with respect to the workpiece holder,
   selecting each workpiece holder from a location on said storage means;
   transporting each selected workpiece holder by said transport means between said storage means and at least one preselected machine tool,
   automatically and sequentially locating and securing each of said workpiece holders at a predetermined location and attitude in each of said selected machine tools, and
   subsequently performing programmed operations on each of said workpieces in each of said selected machine tools while said workpiece holder is so located and secured therein, the operating sequence performed by said storage means, transport means and machine tools, including selecting, locating and securing workpiece holders, being under the control of said control means, the operating sequences of different workpieces, under the control of said control means, being different.

5. The precess of producing engineering components from a plurality of batches of different forms of workpieces by means of a machining system comprising a plurality of machine tools capable of performing different machining operations and adapted to use a series of selected tools, storage means for storing a plurality of workpieces so that each workpiece is selectively accessible, transport means to transport workpieces between a succession of said machine tools, and programmable control means, each batch comprising a plurality of workpieces requiring substantially the same machining operation and the workpieces of different batches requiring different machining operation; said process comprising:

mounting each workpiece on a pallet adapted for locating said workpiece at each of said machine tools required for machining said workpiece;

locating each pallet-mounted workpiece on said storage means so that each pallet-mounted workpiece is selectively accessible;

selecting each of said pallet-mounted workpieces from said storage means and transporting each of said selected pallet-mounted workpieces by said transport means to at least a selected one of said machine tools, selecting and mounting required tools in each of said selected machine tools and machining said pallet-mounted workpieces at each of said selected machine tools;

monitoring the location of each workpiece during the various stages of its transporting and machining sequence by periodically entering into said control means information relevant to each of said workpieces; and dismounting each machined workpiece from its associated pallet after completion of said transporting and machining sequence;

the operating sequence of storing, transporting and machining steps, including said selecting step, for each pallet mounting workpiece being under the control of said control means, the pallet-mounted workpieces of different batches being controlled to follow different sequences.

6. The process of producing engineering components from a plurality of batches of different forms of workpieces to form machined products by means of a machining system comprising a plurality of machine tools capable of performing different machining operation, storage means adapted for storing a plurality of workpieces so that each workpiece is selectively accessible, transport means to transport selected of said workpieces on said storage means between said storage means and said machine tools, and programmable control means, each batch comprising a plurality of workpieces requiring substantially the same machining operations and the workpieces of different batches requiring different machining operations; said process comprising:

delivering each workpiece onto said storage means for storage so that it is selectively accessible;

selecting and transporting each workpiece in turn by said transport means from said storage means to one of said machine tools for performance of a first machining operation;

transporting said selected workpiece by said transport means back to said storage means after the completion of said first machining operation for storage so that said selected workpiece is selectively accessible;

transporting said selected workpiece by said transport means to a further one of said machine tools for the performance of a second machining operation thereon; and transporting said selected workpiece by said transport means back to said storage means after the completion of said second machining operation;

the operating sequence of storage, transporting and machining steps unique for each workpiece, including said selecting step, being under the control of said control means, the workpieces of different batches being subjected to a different predetermined sequence of storage, transporting, and machining steps.

7. The process of producing engineering components from a plurality of batches of different forms of workpieces by means of a machining system comprising a plurality of machine tools capable of performing different machining operations, storage means adapted for storing a plurality of workpiece so that each workpiece is selectively accessible, and programmable control means adapted to control each machine tool, each batch comprising a plurality of workpiece requiring substantially the same machining operations and the workpieces of different batches requiring different machining operations; said process comprising:

delivering each workpiece to said storage means and storing each workpiece so that it is selectively accessible;

select and transporting each workpiece in turn from said storage means to one of said machine tools for the performance of a first machining operation thereon;

transporting said selected workpiece back to said storage means after the completion of said first machining operation;

transporting said selected workpiece to a further one of said machine tools for the performance of a second machining operation thereon; and transporting said selected workpiece back to said storage means after the completion of said second machining operation;

the operating sequence of storage, transporting and machining steps, including said selecting step, applicable to each said workpiece being under the control of said control means, the workpieces of different batches being subjected to a different predetermined sequence of storage, transporting and machining steps.

8. The process of producing engineering components from a plurality of batches of different forms of workpieces by means of a plurality of machine tools capable of performing different operations upon the workpieces, storage means adapted for storing a plurality of workpieces so that each workpiece is selectively accessible, and programmable control means adapted to control each of said machine tools, each batch comprising a plurality or workpieces requiring substantially the same operations to be performed upon them by said machine tools, and the workpieces of different batches requiring different machine tool operations; said process comprising:

delivering each workpiece onto said storage means and storing each workpiece so that it is selectively accessible;

selecting and transporting each workpiece from said storage means to one of said machine tools for the performance of a first machine tool operation thereon;

transporting said selected workpiece back to said storage means after the completion of said first machine tool operation;

transporting said selected workpiece to a further one of said machine tools for the performance of a second machine tool operation thereon; and transporting said selected workpiece back to said storage means after the completion of said second machine tool operation;

the operating sequence of storage, transporting and machine tool operations, including said selecting step, applicable to each said workpiece being under the control of said control means, the workpieces of different batches being subjected to a different predetermined sequence of storage, transporting and machine tool operations.

9. The process of producing engineering components from a plurality of batches of different forms of workpieces by means of a machining system comprising a plurality of machine tools capable of performing different machining operations, storage means adapted for storing a plurality of workpieces so that each workpiece is selectively accessible, and programmable control means, each batch comprising a plurality of workpieces requiring substantially the same machining operations and the workpieces of different batches requiring different machining operations; said process comprising:
  mounting each workpiece on a pallet adapted for locating said workpiece on a pallet adapted for locating said workpiece at each of said machine tools required for machining said workpiece;
  delivering each pallet-mounted workpiece onto said storage means for storage so that it is selectively accessible;
  selecting and transporting each pallet-mounted workpiece from said storage means to one of said machine tools for the performance of a first machining operation thereon;
  transporting said selected pallet-mounted workpiece back to said storage means after the completion of said first machining operation;
  transporting said selected pallet-mounted workpiece to another of said machine tools for the performance of a second machining operation thereon; and
  transporting said selected pallet-mounted workpiece back to said storage means after the completion of the second machining operation;
  the operating sequence of storage, transporting and machining steps, including said selecting step, applicable to each said workpiece being under the control of said control means; the workpieces of different batches being subjected to a different predetermined sequence of storage, transporting and machining steps.

10. The process of producing engineering components from a plurality of workpieces of different forms by means of a machining system comprising a plurality of machine tools capable of performing different machining operations, storage means adapted for storing a plurality of workpieces so that each workpiece is selectively accessible, transport means for transporting said workpieces, and programmable control means; said process comprising:
  selecting each workpiece from said storage means and transporting said selected workpiece along a predetermined route including at least one stop at a preselected machine tool for at least one machining operation on said selected workpiece and at least one stop at said storage means, different selected workpieces following different predetermined routes and having different combinations of storage, transporting and machining sequences; and
  the operating sequence of storage and transporting steps for each workpiece and the machining operation by said at least one machine tool being under the control of said control means, the operating sequence of at least one workpiece being different from the operating sequences of other workpieces.

11. The process of claim 10 wherein the act of selecting each workpiece from said storage means comprises selecting a workpiece independently of other workpieces.

12. The process of producing engineering components from a plurality of workpieces of different forms by means of a mac g system comprising a plurality of machine tools capable of performing different machining operations, storage means for storing a plurality of workpieces so that each workpiece is selectively accessible, transport means, and programmable control means; said process comprising:
  mounting each workpiece on a pallet adapted for locating said workpiece at each of said machine tools required for machining said workpiece;
  locating each pallet-mounted workpiece on said storage means so that it is selectively accessible;
  operating said machining system including the selection of each pallet-mounted workpiece from said storage means and the transporting of each selected pallet-mounted workpiece by said transport means between said storage means and at least one machine tool; and
  monitoring the location of each pallet-mounted workpiece at the various stages of its operating sequence by periodically entering into said control means information relevant to each workpiece;
  the operating sequence of storage, transporting and machining steps, including said selection step, of each said pallet-mounted workpiece being under the control of said control means, the operating sequences of different pallet-mounted workpieces being different.

13. The process of producing engineering components from a plurality of batches of different forms of workpieces by means of a machining system comprising a plurality of machine tools capable of performing different machining operations, storage means having a plurality of selectively accessible locations for workpieces, transport means, and programmable control means, each batch comprising a plurality of work places requiring substantially the same machining operations and the workpieces of different batches requiring different machining operations; said process comprising:
  selecting each workpiece from a predetermined location on said storage means and transporting said selected workpiece by said transport means along a predetermined route including stops at preselected of said machine tools and at least one predetermined location on said storage means;
  the operation sequence of storage, transporting and machining steps, including said selecting step, of each said workpiece being under the control of said control means, the operating sequences of the workpieces of each batch being the same and the operating sequences of the workpieces of different batches having different combinations of storage, transporting and machining steps.

14. A method of machining a plurality of batches of different forms of workpieces requiring different machining operations from a plurality of machine tools capable of performing different machining operations, each batch comprising a plurality of workpieces of similar form, comprising:
  mounting each workpiece on a pallet adapted for locating said workpiece in each of said machine tools required for machining said workpiece,
  locating each pallet-mounted workpiece so that it is selectively accessible at a location on storage means for the commencement of its operating sequence,
  entering into control means details of each workpiece whereby the location of each workpiece at various stages of it s operating sequence is monitored by said control means, machining each pallet-mounted workpiece including transporting each pallet-mounted workpiece, selected from one of said locations at said storage means, between said storage means and at least one machine tool, and dismounting each workpiece from its associated pallet after completion of said operating sequence, the operating sequence of machining and transporting steps for each workpiece being under the control of said control means, the operating sequences for different workpieces being different.

15. A method of producing engineering components from a plurality of batches of different forms of workpieces requiring the performance thereon of different operations by a plurality of machine tools, each batch consisting of workpieces of similar form, comprising delivering each workpiece onto storage means capable of holding a plurality of workpieces so that each workpiece is selectively accessible, entering into programmable control means the identity of each workpiece, selecting and transporting each workpiece in turn from said storage means to a first machine tool for the performance of first operation thereon, transporting said selected workpiece back to said storage means after the completion of said first operation, and subsequently to a second machine tool for the performance of a second operation thereby and then back to said storage means, each said transporting step being under the control of said programmable control means in accordance with a predetermined sequence of storage, transporting and machine tool operations unique for said selected workpiece, workpieces of different forms being subjected to different sequences of said operations.

16. The method of claim 15 wherein the act of delivering each workpiece onto storage means comprises delivering each workpiece onto storage means capable of holding a plurality of workpieces so that each workpiece is selectively accessible independently of the other workpieces.

17. A method of machining a plurality of batches of different forms of workpieces requiring different machining operations from a plurality of machine tools capable of performing different machining operations, each batch consisting of workpieces of similar form, comprising delivering each workpiece to storage means and storing said workpieces on said storage means so that each workpiece is selectively accessible;

entering into programmable control means means for determining the identity of each workpiece;

selecting and transporting each workpiece in turn from said storage means to a first machine tool for the performance of a first machining operation thereof;

transporting said selected workpiece back to said storage means after the completion of said first machining operation, storing said workpiece on said storage means so that it is selectively accessible, and subsequently selecting and transporting said workpiece from said storage means to a second machine tool for machining thereby and then back to said storage means;

each said transporting step being under the control of said control means in accordance with a predetermined operating sequence of storing, transporting and machining steps unique to said selected workpiece, workpieces of a different form being subjected to a different predetermined operating sequence.

18. A method of machining a plurality of batches of different forms of workpieces requiring different machining operations from a plurality of machine tools capable of performing different machining operations, each batch consisting of workpieces of similar form, comprising delivering each workpiece to storage means adapted for storing said workpiece on said storage means so that each workpiece is selectively accessible, selecting and transporting each workpiece in turn from said storage means to a first machine tool for the performance of a first machining operation thereon, transporting said selected workpiece back to said storage means after the completion of said first machining operation, storing said workpiece on said storage means so that it is selectively accessible, and subsequently selecting and transporting said workpiece from said storage means to a second machine tool for machining thereby and then back to said storage means, each of said transporting and machining operations being under the control of a programmable control means in accordance with a predetermined sequence of storage, transporting and machining operations unique to said selected workpiece, workpieces of different forms being subjected to a different sequence of storage, transporting and machining operation.

19. A method of machining a plurality of batches of different forms of workpieces requiring different machining operations from a plurality of machine tools capable of performing different machining operations, each batch consisting of workpieces of similar form, comprising mounting each workpiece on a pallet adapted for locating said workpiece in each of said machine tools by which it is to be machined, delivering each pallet-mounted workpiece onto storage means adapted for storing a plurality of the pallet-mounted workpieces so that each workpiece is selectively accessible, entering into programmable control means the identity of each workpiece and the location thereof on said storage means, selecting a pallet-mounted workpiece from said storage means and transporting said selected pallet-mounted workpiece to first machine tool for the performance of a first machining operation thereon, transporting said selected pallet-mounted workpiece back to said storage means for storage so that each workpiece is selectively accessible after the completion of said first machining operation, and subsequently selecting and transporting said pallet-mounted workpiece from said storage means to a second machine tool for machining thereby and then back to the storage means, each of said transporting and machining operations being under the control of said control means in accordance with a predetermined sequence of storage, transporting and mach operations unique to said selected workpiece, workpieces of different forms being subjected to a different preprogrammed sequence of storage, transporting and machining operations.

20. The method of claim 19 wherein the act of delivering each pallet-mounted workpiece onto storage means comprises delivering each pallet-mounted workpiece onto storage means adapted for storing a plurality of the pallet-mounted workpieces so that each workpiece is selectively accessible independently of the other workpieces.

21. A method of machining a plurality of different workpieces requiring different forms of machining operations from a plurality of machine tools capable of performing different machining operations comprising:

conveying each workpiece under the control of a programmable control means along a predetermined route including, for at least some of the workpieces, preselected machining stops at a plurality of machine tools and at least one stop at a selected location on storage means adapted for storing a plurality of workpieces so that each workpiece is selectively accessible, different selected workpieces being caused to follow different predetermined routes and to have different combinations of machining and storage sequences under the control of said control means.

22. A method of machining a plurality of different workpieces requiring different machining operations from a plurality of machine tools capable of performing different machining operations under the control of a programmable control means, comprising:

mounting each workpiece on a pallet adapted for locating said workpiece in each of said machine tools required for machining said workpiece;

locating each pallet-mounted workpiece, for the commencement of its operating sequence, on storage means so that each workpiece is selectively accessible;

selecting and transporting each pallet-mounted workpiece from said storage means to at least one of said machine tools;

performing at least one machining operation on said selected pallet-mounted workpiece at said at least one of said machine tools; and entering into said control means details of said selected workpiece whereby the location of said selected workpiece at various stages of its operating sequence is monitored by said control means;

the operating sequence of storage, transporting and machining steps being under the control of said control means, different workpieces having different operating sequences.

23. A method of machining a plurality of batches of different forms of workpieces requiring different machining operations from a plurality of machine tools capable of performing different machining operations, each batch comprising a plurality of workpieces of similar form, comprising:

conveying each workpiece along predetermined route including, for at least some of the workpieces, preselected machining stops at a plurality of machine tools and at least one predetermined period of being located at a selected location on storage means on which each workpiece is selectively accessible, the operating sequence of machining, conveying and storage operations for each workpiece being under the control of programmable control means, workpieces of different forms following different combination of machining, conveying and storage sequences and workpieces of the same form following similar such combinations.

24. The process of producing engineering components from a plurality of workpieces of different forms by means of a machining system comprising a plurality of machine tools capable of performing different machining operations, storage means for storing a plurality of workpieces so that each workpiece is selectively accessible, transport means, and programmable control means, said process comprising:

mounting each workpiece on pallet adapted for locating said workpiece at each of said machine tools required for machining said workpiece;

locating each pallet-mounted workpiece in said machining system for the commencement of its machining sequence;

operating said machining system, including the transporting of each selected pallet-mounted workpiece by said transport means to and from said storage means and the transporting of each selected pallet-mounted workpiece by said transport means between said storage means and at least one machine tool; and monitoring the location of each workpiece at the various stages of its operating sequence by periodically entering into said control means information relevant to each workpiece;

the operating sequence of storage and transport steps for each workpiece and the machining operation by said at least one machine tool being under the control of said control means, the operating sequence of at least one workpiece being different from the operating sequences of other workpieces.

25. The method of claim 24 wherein said storage means comprises a storage in which a plurality of workpieces may be placed so that each workpiece is selectively accessible independently of other workpieces.

26. A method of machining, by means of a plurality of machine tools, a plurality of batches of different forms of workpieces requiring different machining operations, each batch comprising a plurality of workpieces of similar form, comprising:

storing each workpiece on storage means so that each workpiece is selectively accessible;

detecting when a machine tool has completed a machining operation on a particular workpiece and is ready to receive another workpiece;

transporting said particular workpiece from said machine tool;

transporting a selected further workpiece from said storage means to said machine tool; and machining further workpieces by following similar detecting and transporting steps in relation to appropriate workpieces and appropriate machine tools;

said machining and transporting operations being under the control of control means.

27. The method of claim 26 wherein the act of storing each workpiece comprises storing each workpiece on a storage means so that each workpiece is selectively accessible independently of other workpieces.

28. A method of machining, by means of a plurality of machine tools, a plurality of batches of different forms of workpieces requiring different machining operations, each batch comprising a plurality of workpieces of similar form, comprising:

storing each workpiece on storage means so that each workpiece is selectively accessible;

detecting when a machine tool has completed a machining operation on a particular workpiece and is ready to receive another workpiece;

transporting said particular workpiece from said machine tool to a selected location on said storage means;

transporting a selected further workpiece from said storage means to said machine tool; and machining further workpieces by following similar detecting and transporting steps in relation to appropriate workpieces and appropriate machine tools;

said machining, storage and transporting operations being under the control of control means.

29. A method of machining by means of a plurality of machine tools, a source of workpieces, and common transport means for transporting workpieces between said source and said machine tools, a plurality of batches of different workpieces requiring different machining operations under the control of programmable control means, each batch comprising workpieces of a similar form, comprising:
  locating each workpiece at said source so that it is selectively accessible;
  detecting when a machine tool has completed a machining operation on a workpiece ad is ready to receive a further workpiece;
  operating said common transport means to select and deliver a further workpiece from said source to said machine tool;
  operating said machine tool to perform the appropriate machining operation on said further workpiece;
  detecting when said machining operation on said her workpiece has been completed;
  operating said common transport means to remove said further workpiece from said machine tool; and
  proceeding in similar manner to machine still further workpieces by said machine tool and the other of said machine tools;
  the operation of said machine tools and said transport means being under the control of said control means.

30. The method of claim 29 wherein said locating step comprises locating each workpiece as said source so that each workpiece is selectively accessible independently of other workpieces.

31. The process of producing a plurality of different engineering components from workpieces of different forms by performance of operations thereon by means of a plurality of data controlled machine tools each of which has automatic means for locating and securing thereon a workpiece, storage means having a plurality of locations for workpieces stored thereon so that each workpiece is selectively accessible, transport means, and programmable control means, said machine tools being capable of performing different machining operations; said process comprising:
  selecting each workpiece from a location on said storage means,
  transporting each selected workpiece by said transport means between said storage means and at least one preselected machine tool,
  automatically and sequentially locating and securing each of said workpieces at a predetermined location and attitude in each of said selected machine tools, and subsequently
  performing programmed operation on each of said workpieces in each of said selected machine tools while said workpiece is so located and secured therein,
  the operating sequence performed by said storage means, transport means and machine tools being under the control of said control means, the operating sequences of different workpieces, under the control of said control means, being different.

32. A method of machining, by means of a plurality of machine tools, a plurality of batches of workpieces, each batch consisting of a plurality of workpieces of similar form and requiring similar machining operations, the workpieces of different batches being of different form and requiring different machining operations; said method comprising:
  storing said workpieces of different forms on storage means so that each workpiece is selectively accessible;
  selecting each workpiece from said storage means;
  transporting each said selected workpiece by transport means between said storage means and at least one selected machine tool;
  selecting the program required for a selected workpiece delivered to a selected machine tool; and
  performing the programmed machining operation on said selected workpiece while located at said selected machine tool;
  said selecting of workpieces and transporting of said selected workpieces being under the control of control means;
  at least a portion of said workpieces being subjected to different sequences of storing, transporting and machining steps.

33. The method of claim 32 wherein said storing step comprises storing said workpieces of different form so that each workpiece is selectively accessible from said storage means independently of other workpieces.

34. A process for producing engineering components from workpieces by the removal of material therefrom by means of a plurality of data-controlled machine tools, each of which has automatic means for locating and securing therein a workpiece, said machine tools being capable of performing different machining operations on the workpiece; said process comprising:
  delivering each workpiece to storage means and storing each of said delivered workpieces so that it is selectively accessible;
  selecting each workpiece from said storage means;
  presenting each of said selected workpieces to at least one selected of said machine tools;
  automatically locating and securing each of said selected workpieces at a predetermined location and attitude in said at least on selected of said machine tools; and subsequently
  performing programmed machining operations on each of said selected workpieces in the respective of said at least one selected of said machine tools while said selected workpieces are located and secured therein.

35. The method of claim 34 wherein the act of storing each of said delivered workpieces comprises storing each of said delivered workpieces so that it is selectively accessible independently of other workpieces.

36. A method of machining, by means of a plurality of machine tools, a plurality of batches of different forms of workpieces requiring different machining operations, each batch comprising a plurality of workpieces of similar form; comprising:
  storing each workpiece on storage means so that it is selectively accessible;
  detecting when a machine tool has completed a machining operation on a particular workpiece and is ready to receive another workpiece;
  transporting said particular workpiece from said machine tool;
  selecting a further workpiece from said storage means and transporting said selected further workpiece from said storage means to said machine tool; and
  machining further workpieces by following similar detecting and transporting steps in relation to appropriate workpieces and appropriate machine tools;
  said transporting operations being under the control of central control means and said machine tools each being operated by programmable means for performing an appropriate machine operation on each workpiece transported thereto.

37. The method of claim 36 wherein the act of storing each workpiece comprises storing each workpiece on storage means so that it is selectively accessible independently of other workpieces.

38. A process for producing engineering components from workpieces by the removal of material therefrom by means of a plurality of data-controlled machine tools, each of which has an automatic locating and securing device for a workpiece, said machine tools being capable of performing different machining operations on the workpieces; said process comprising:
delivering and storing each workpiece so that it is selectively accessible;
selecting each workpiece from storage;
presenting each of said selected workpieces to at least one selected of said machine tools;
automatically locating and securing each of said selected workpieces at a predetermined location and attitude in said at least one selected of said machine tools; and subsequently
performing programmed machining operations on each of said selected workpieces in the respective of said at least one selected of said machine tools while said selected workpieces are located and secured therein.

39. The process of producing engineering components from a plurality of workpieces of different forms by means of a machining system comprising a plurality of machine tools capable of performing different machining operation, a storage containing a plurality of workpieces, each workpiece being selectively accessible, a transport mechanism, and a programmable control system, said process comprising:
mounting each workpiece on a pallet configured to permit said workpiece to be located at each of said machine tools required for machining said workpiece;
locating each pallet-mounted workpiece in said machining system for the commencement of its machining sequence;
operating said machining system, including by transporting each selected pallet-mounted workpiece to and from said storage and between said storage and at least one machine tool; and
monitoring the location of each workpiece at the various stages of its operating sequence by periodically entering into said control system information relevant to each workpiece;
the operating sequence of storage and transporting steps for each workpiece and the machining operation by said at least one machine tool being under the control of said control system, the operating sequence of at least one workpiece being different from the operating sequences of other workpieces.

40. The process of producing engineering components from a plurality of workpieces of different forms by means of a machining system comprising a plurality of machine tools capable of performing different machining operations, a storage device structured to store a plurality of workpieces in selectively accessible fashion, a workpiece transporter, and a programmable control system; said process comprising:
selecting each workpiece from storage and transporting said selected workpiece along a predetermined route including at least one stop at a preselected machine tool for at least one machining operation on said selected workpiece and at least one stop at storage, different selected workpieces following different predetermined routes and having different combinations of storage, transporting and machining sequences; and
the operating sequence of storage and transporting steps for each workpiece and the machining operation by said at least one machine tool being under the control of said control system, the operating sequence of at least one workpiece being different from the operating sequences of other workpieces.

41. A method of machining by means of a plurality of machine tools, a source of workpieces, and a common workpiece transporter extending between said source and said machine tools, a plurality of batches of different workpieces requiring different machining operations under programmable control, each batch comprising workpieces of a similar form, comprising:
locating each workpiece at said source so that it is selectively accessible;
detecting when a machine tool has completed a machining operation on a workpiece and is ready to receive a further workpiece;
operating said common transporter to select and deliver a further workpiece from said source to said machine tool;
operating said machine tool to perform the appropriate machining operation on said further workpiece;
detecting when said machining operation on said further workpiece has been completed;
operating said common transporter to remove said further workpiece from said machine tool; and
proceeding in similar manner to machine still further workpieces by said machine tool and the other of said machine tools;
the operation of said machine tools and said transporter being under programmable control.

42. The process of producing a plurality of different engineering components from workpieces of different forms by a plurality of data controlled machine tools, said machine tools being complementary to each other in relation to the operations to be carried out on said workpieces, said process comprising:
(a) securing each workpiece to a workpiece holder in a predetermined position and attitude with respect to the workpiece holder,
(b) delivering each workpiece holder to storage and storing each workpiece holder so that each workpiece is selectively accessible,
(c) selecting each workpiece holder from said storage,
(d) presenting each of said selected workpiece holders to selected of said machine tools in predetermined sequence, the sequence for each form of workpiece being different,
(e) automatically and sequentially locating each of said selected workpiece holders at a predetermined location with respect to each of said selected machine tools, and
(f) subsequently performing programmed machine operations on each of said workpieces with each of said selected machine tools while the respective holder is so located.

43. The process of producing a plurality of different engineering components from workpieces of different forms by performance of operations thereon by a plurality of data-controlled machine tools, a storage having a plurality of locations for workpieces stored thereon so that each workpiece is selectively accessible, a transporter, and a programmable controller, said machine tools being complementary to each other in relation to the operations to be carried out on said workpieces, said process comprising:

(a) securing each workpiece to a workpiece holder in a predetermined position and attitude with respect to the workpiece holder, (b) selecting each workpiece holder from a location on said storage means;

(c) transporting each selected workpiece holder by said transporter between said storage and at least one preselected machine tool, (d) automatically and sequentially locating each of said workpiece holders at a predetermined location with respect to each of said selected machine tools, and (e) subsequently performing programmed operations on each of said workpieces at each of said selected machine tools while said workpiece holder is so located, the operating sequence performed by said storage, transporter and machine tools, including selecting and locating workpiece holders, being under the control of said programmable controller, the operating sequences of different workpieces, under the control of said programmable controller, being different.

* * * * *

UNITED STATES PATENT AND TRADEMARK OFFICE
CERTIFICATE OF CORRECTION

PATENT NO. : 7,065,856 B1
APPLICATION NO. : 07/126319
DATED : June 27, 2006
INVENTOR(S) : Jerome H. Lemelson It is certified that error appears in the above-identified patent and that said Letters Patent is hereby corrected as shown below:

Title Page, Item (57) Abstract on page 3 of the patent, line 8 change "wither" to --either--
Column 2, line 38 change "2'" to --2a--
Column 2, line 40 change "2" to --2b--
Column 2, line 46 change "3'" to --3a--
Column 5, line 61 change "321" to --32'--
Column 6, line 4 change "include" to --includes--
Column 6, line 48 change "2'" to --2a--
Column 7, line 42 change "2''" to --2a--
Column 7, line 60 change "2''" to --2a--
Column 8, line 62 change "." to --:--
Column 9, line 34 change "now" to --not--
Column 9, line 52 after "thereto" insert --.--
Column 12, line 25 change "circus" to --circuit--
Column 17, line 12 change "2'" to --2a--
Column 19, line 45 change "2'" to --2a--
Column 19, line 47 change "2'" to --2a--
Column 19, line 49 change "3'" to --3a--
Column 21, line 46 change "2'" to --2a-- and change "2''" to --2b--
Column 22, line 13 after "conveyors" insert --.--
Column 23, line 9 change "fork" to --work--
Column 24, line 2 (Claim 2) change "fools" to --tools--
Column 24, line 60 (Claim 5) change "precess" to --process--
Column 26, line 17 (Claim 7) change "select" to --selecting--
Column 26, line 43 (Claim 8) change "or" to --of--
Column 28, line 3 (Claim 12) change "mac g" to --machining--
Column 30, line 58 (Claim 19) change "mach" to --machining--
Column 32, line 17 (Claim 24) change "transport" to --transporting--
Column 33, line 20 (Claim 29) change "her" to --further--

UNITED STATES PATENT AND TRADEMARK OFFICE
CERTIFICATE OF CORRECTION

PATENT NO. : 7,065,856 B1
APPLICATION NO. : 07/126319
DATED : June 27, 2006
INVENTOR(S) : Jerome H. Lemelson It is certified that error appears in the above-identified patent and that said Letters Patent is hereby corrected as shown below:

Column 33, line 66 (Claim 32) change "on" to --in--

Signed and Sealed this

Tenth Day of February, 2009

JOHN DOLL
*Acting Director of the United States Patent and Trademark Office*